(12) United States Patent
Ichimi et al.

(10) Patent No.: US 11,276,144 B2
(45) Date of Patent: Mar. 15, 2022

(54) INFORMATION PROCESSING APPARATUS, DISPLAY CONTROL METHOD, AND STORAGE MEDIUM

(71) Applicant: CANON KABUSHIKI KAISHA, Tokyo (JP)

(72) Inventors: Hideshi Ichimi, Tsukuba (JP); Masayuki Yamada, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 50 days.

(21) Appl. No.: 16/694,755

(22) Filed: Nov. 25, 2019

(65) Prior Publication Data
US 2020/0090302 A1 Mar. 19, 2020

Related U.S. Application Data

(63) Continuation of application No. 14/822,600, filed on Aug. 10, 2015, now abandoned.

(30) Foreign Application Priority Data

Aug. 11, 2014 (JP) ................ 2014-163720
Aug. 11, 2014 (JP) ................ 2014-163723
Jun. 11, 2015 (JP) ................ 2015-118437

(51) Int. Cl.
*G06T 3/40* (2006.01)
*G06F 3/04883* (2022.01)
(Continued)

(52) U.S. Cl.
CPC .............. *G06T 3/40* (2013.01); *G06F 3/0485* (2013.01); *G06F 3/04883* (2013.01); *G06F 3/04886* (2013.01); *G06F 2203/04806* (2013.01)

(58) Field of Classification Search
CPC ..... G06T 3/40; G06T 3/0485; G06F 3/04883; G06F 3/04886; G06F 2203/04806
See application file for complete search history.

(56) References Cited

U.S. PATENT DOCUMENTS 8,468,469 B1 * 6/2013 Mendis ................. G06F 3/0484
715/863
2010/0287493 A1 * 11/2010 Majumder ............ G06F 3/0481
715/788
2012/0030635 A1 * 2/2012 Miyazaki ............ G06F 3/04812
715/863

FOREIGN PATENT DOCUMENTS

JP 2004110719 A * 4/2004
JP 2004258476 A 9/2004
(Continued)

OTHER PUBLICATIONS

"Use the Magnifying Glass Tool in Preview to Zoom into Image Detail on Mac", Oct. 3, 2011, https://osxdaily.com/2011/10/03/magnifying-glass-tool-zoom-image-preview/ (Year: 2011).*

*Primary Examiner* — Michelle L Sams
(74) *Attorney, Agent, or Firm* — Canon U.S.A., Inc. IP Division

(57) ABSTRACT

An information processing apparatus realizing an enlargement function without system-level customization is provided. The information processing apparatus includes an application unit, an enlargement control unit, and a screen control unit. The application unit generates and draws an image in a normal display area. The enlargement control unit enlarges the image drawn in the normal display area, and generates and draws an enlarged image including part of the enlarged image in an expansion display area. The screen control unit displays the image drawn in the normal display area on a display when the enlargement function is invalid, and displays the enlarged image drawn in the expansion (Continued)

display area on the display when the enlargement function is valid.

11 Claims, 22 Drawing Sheets

(51) Int. Cl.
*G06F 3/0485* (2022.01)
*G06F 3/04886* (2022.01)

(56) References Cited

FOREIGN PATENT DOCUMENTS

| | | | |
|---|---|---|---|
| JP | 2005025170 | A | 1/2005 |
| JP | 2008275560 | A | 11/2008 |
| JP | 2012168943 | A | 9/2012 |
| JP | 2013088176 | A | 5/2013 |

* cited by examiner

FIG.6
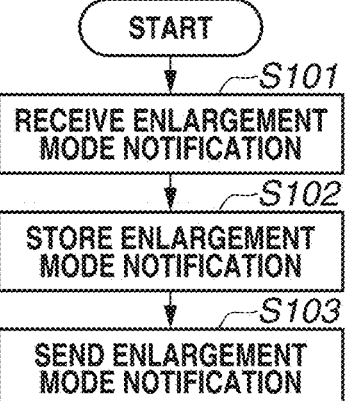
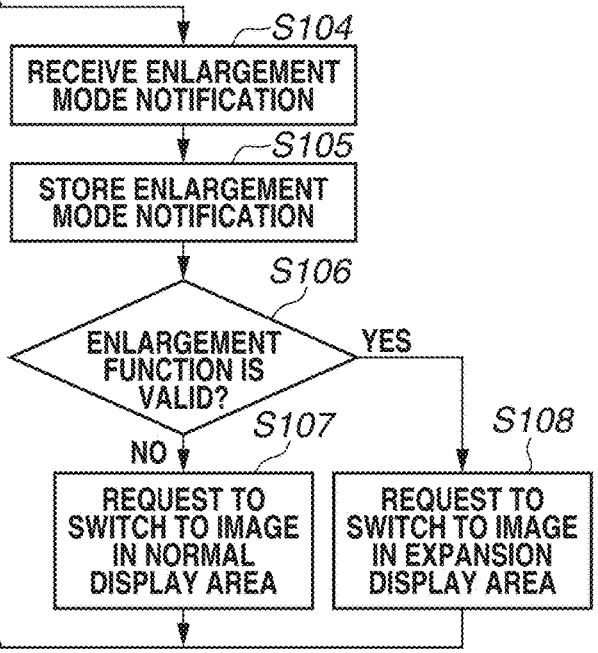
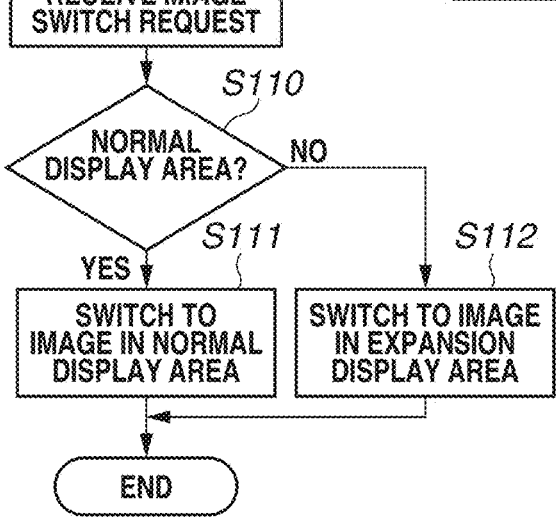

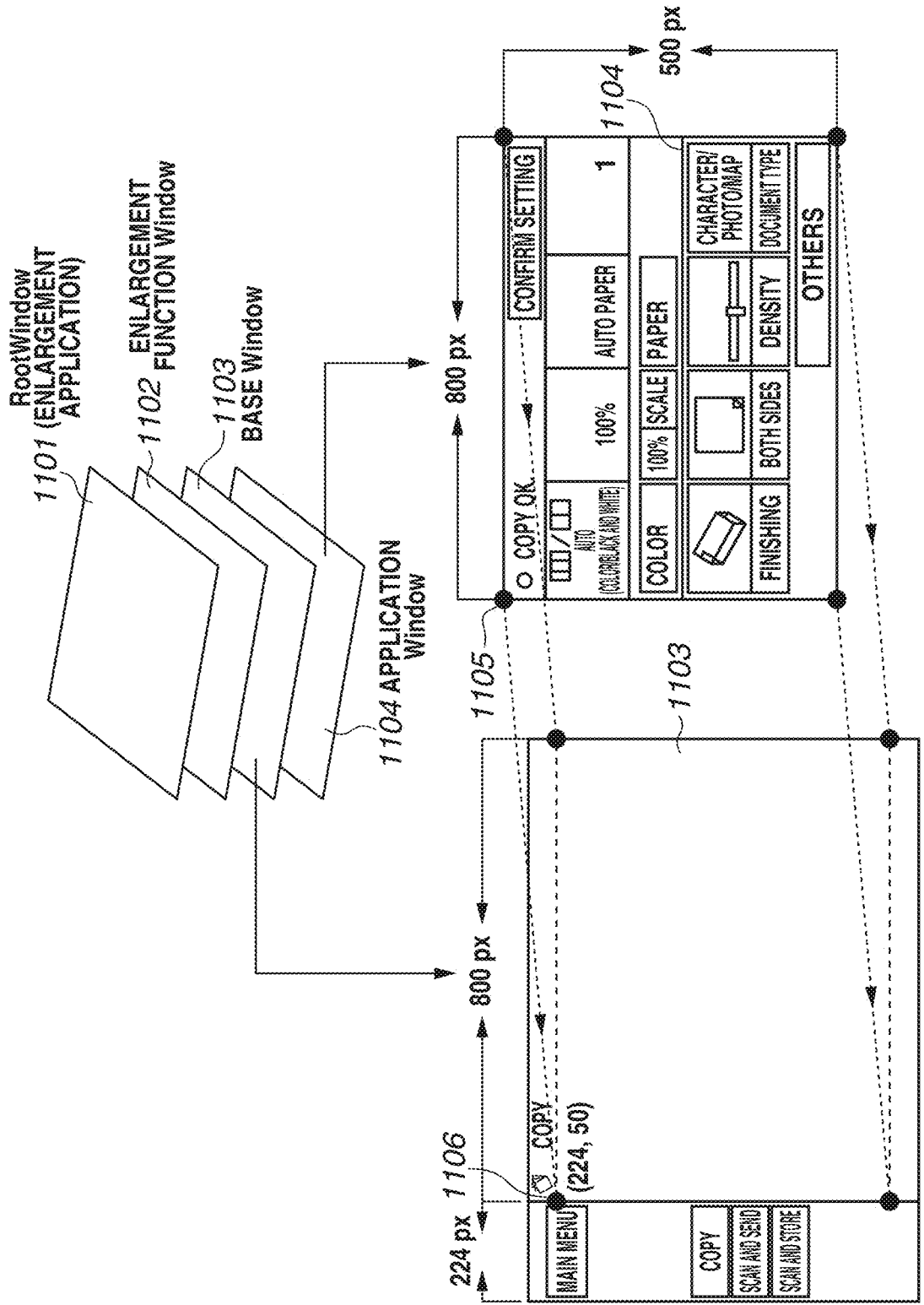

INFORMATION PROCESSING APPARATUS, DISPLAY CONTROL METHOD, AND STORAGE MEDIUM

This application is a continuation of U.S. application Ser. No. 14/822,600, filed Aug. 10, 2015, and further claims the benefit of Japanese Patent Application Laid-Open No. 2014-163720, filed Aug. 11, 2014, No. 2014-163723, filed Aug. 11, 2014, and No. 2015-118437, filed Jun. 11, 2015, which are hereby incorporated by reference herein in their entirety.

BACKGROUND OF THE INVENTION

Field of the Invention

The present invention relates to an information processing apparatus having an enlargement function of enlarging and displaying an image presented on a display screen of a display apparatus.

Description of the Related Art

Some information processing apparatuses including a display apparatus include an enlargement function of enlarging and displaying an image presented on the display apparatus at a desired enlargement rate. The information processing apparatuses can enlarge not only content depending on application software (AP) for photographs and characters but also an entire image displayed on the display screen. Thus, the information processing apparatuses can display all the images displayed on the display screen including objects such as icons for users at a proper size. The users can operate based on the enlarged images. Therefore, accessibility is enhanced, and even weak-eyed users can operate the apparatus without impairing its operation. Japanese Patent Application Laid-Open No. 2012-252370 discusses therein such an information processing apparatus in which part of a captured display screen can be zoomed.

The enlargement function generally needs to enlarge an entire image while constantly updating the display screen, and is incorporated at a system level such as operating system (OS) or window system. Therefore, an entire image displayed on a display screen cannot be enlarged and displayed in a case of an information processing apparatus not employing an OS or window system having the enlargement function. Further, the enlargement function is difficult to add later in the OS or window system due to license issue.

Further, currently in the market, an information processing apparatus is not provided in which when an AP execution screen is enlarged and displayed by the enlargement function, the AP can be operated by an operation of the enlarged image. In particular, information processing apparatuses have been recently required which are capable of operating AP by operations used in the enlargement function processing such as drag operation and pinch operation.

SUMMARY OF THE INVENTION

The present invention is mainly directed to an information processing apparatus realizing an enlargement function without performing system-level customization.

An information processing apparatus includes an application unit configured to generate a first image, an enlargement control unit configured to enlarge the first image and to generate a second image including part of the enlarged first image, and a screen display unit configured to display either of the first image and the second image on a predetermined display apparatus.

Further features of the present invention will become apparent from the following description of exemplary embodiments with reference to the attached drawings.

BRIEF DESCRIPTION OF THE DRAWINGS

FIG. 6 is a flowchart of image switch processing.

FIG. 20 is an explanatory diagram of an enlarged image display method according to a sixth exemplary embodiment.

DESCRIPTION OF THE EMBODIMENTS

Exemplary embodiments will be described below in detail with reference to the drawings.

<Configuration>

Figure 1:
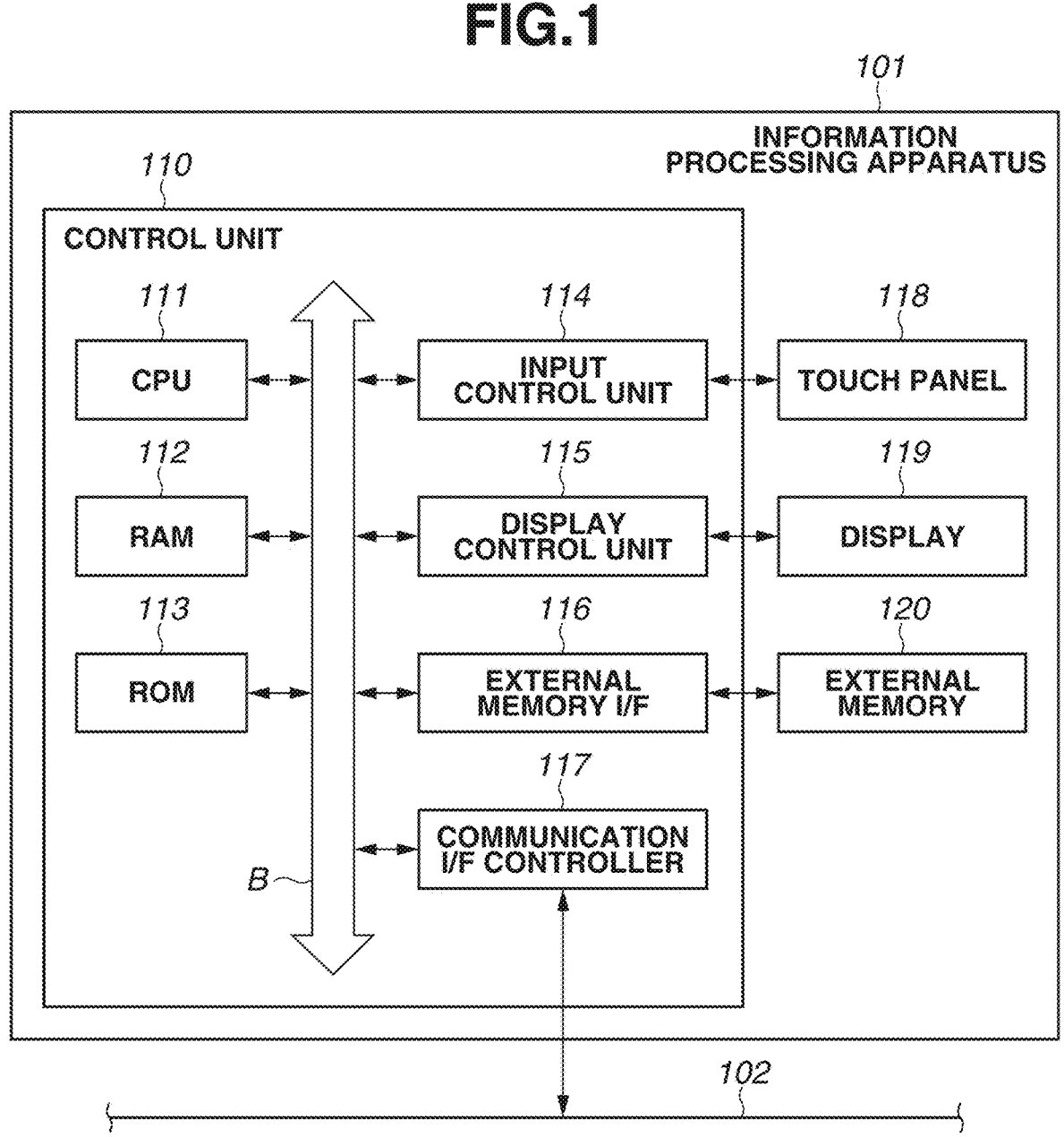
FIG. 1 is a hardware configuration diagram of an information processing apparatus.

FIG. 1 is a hardware configuration diagram of an information processing apparatus according to the present exemplary embodiments. An information processing apparatus 101 is a computer including a display 119 (display apparatus) such as image forming apparatus or Smartphone. The information processing apparatus 101 does not have an enlargement function at a system level such as OS or window system. The information processing apparatus 101 includes a control unit 110, a touch panel 118, and an external memory 120 in addition to the display 119. The control unit 110 includes a central processing unit (CPU) 111, a random access memory (RAM) 112, and a read only memory (ROM) 113, and controls the operations of the entire information processing apparatus 101. Therefore, the control unit 110 includes an input control unit 114 connected to the touch panel 118, a display control unit 115 connected to the display 119, and an external memory interface (I/F) 116 connected to the external memory 120. Further, the control unit 110 includes a communication I/F controller 117 configured to control communication with a network 102 such as local area network (LAN). The CPU 111, the RAM 112, the ROM 113, the input control unit 114, the display control unit 115, the external memory I/F 116, and the communication I/F controller 117 are connected to each other via a system bus B in a communicable manner.

The CPU 111 reads computer programs stored in the ROM 113 or the external memory 120 and executes the programs by use of the RAM 112 as a work area thereby to control the operations of the respective units in the information processing apparatus 101. The ROM 113 is a nonvolatile memory and is a storage medium configured to hold various items of data required for the processing in addition to the computer programs. The RAM 112 is a volatile memory and provides a temporary storage area during the processing.

The input control unit 114 receives a user's operation by use of an input device, and sends a control signal according to the received operation to the CPU 111. In FIG. 1, the touch panel 118 is used as an input device. The input device may employ a character input device such as keyboard or a pointing device such as mouse in addition to the touch panel 118. The touch panel 118 is a pointing device configured to detect a position touched by a user's finger or stylus pen. The touch panel 118 may employ various types such as resistance film type, capacitance type, surface acoustic wave type, infrared type, electromagnetic induction type, image recognition type, and optical sensor type. The input control unit 114 sends a control signal according to a position detected by the touch panel 118 to the CPU 111. The CPU 111 performs processing based on the control signal. The CPU 111 performs processing corresponding to a user's operation on the information processing apparatus 101.

The display control unit 115 displays an image on the display 119 under control of the CPU 111. The display control unit 115 displays an image including objects associated with the processing on the display 119, for example. The display control unit 115 according to the present exemplary embodiments can display an image at an enlargement rate of 100% on the display 119 and can display an enlarged image at a predetermined enlargement rate.

The touch panel 118 is integrally provided on the display screen of the display 119. The touch panel 118 is configured with transmissivity which does not hinder display on the display 119. The CPU 111 identifies an object operated (touched) by the user based on the position of the object displayed on the display 119 and the touch position detected on the touch panel 118, and performs processing associated with the object. In this way, a graphical user interface (GUI) in which the user intuitively operates an image displayed on the display 119 for input can be configured of the touch panel 118 and the display 119.

To the external memory I/F 116, the external memory 120 is mountable such as hard disk, flexible disk, compact disk (CD), digital versatile disc (DVD), or memory card. The external memory I/F 116 reads data from the mounted external memory 120 and writes data into the external memory 120 under control of the CPU 111. The communication I/F controller 117 controls communication with other devices connected to the network 102 via the network 102.

The CPU 111 can detect the following operations or states on the touch panel 118.

Touch-down: an indicator such as finger contacts the touch panel 118 (touching starts)

Move: an indicator remains in contact with the touch panel 118 (touching continues)

Touch-up: an indicator contacting the touch panel 118 is separated (touching ends)

Information about the operations or position coordinates indicating positions touched by the user on the touch panel 118 is notified to the CPU 111 via the input control unit 114 and the system bus B. The CPU 111 determines which operation is performed on the touch panel 118 based on the notified information. The CPU 111 determines a movement direction of a finger or stylus pen in Move per vertical component and per horizontal component, on the touch panel 118 based on a change in position coordinates. For example, it is assumed that the user performs a drag operation by touching the touch panel 118 with a finger and sliding the finger. In this case, the CPU 111 first detects Touch-down and its position coordinates, and then detects Move and its position coordinates at predetermined cycles. When a movement distance is a predetermined value or more, the CPU 111 determines that a drag operation has been performed.

The touch panel 118 can perform multi-touch for detecting a plurality of positions of Touch-down and Move at the same time. The user may move fingers to reduce or expand a distance between two points in the direction of the line segment connecting the two points from a state in which two fingers or stylus pens contact the touch panel. The operation in which the user moves two fingers close to or away from each other looks like a behavior of gripping or expanding an object by fingers, and is called "pinch operation." Generally, in many cases, the pinch operation is performed by the thumb and the index finger of the user. When two points are touched at the same time and one or both of the touch positions are moved, that is, when two Moves are detected at the same time and the position coordinates of the Move are changed, the CPU 111 determines that the pinch operation is performed. Further, the CPU 111 can calculate a center point coordinates of a line segment connecting two points for a pinch operation, and a distance between the two points. When a distance between two points increases, the CPU 111 determines that a pinch-out operation has been performed, and when a distance between two points decreases, the CPU 111 determines that a pinch-in operation has been performed.

Figure 2:
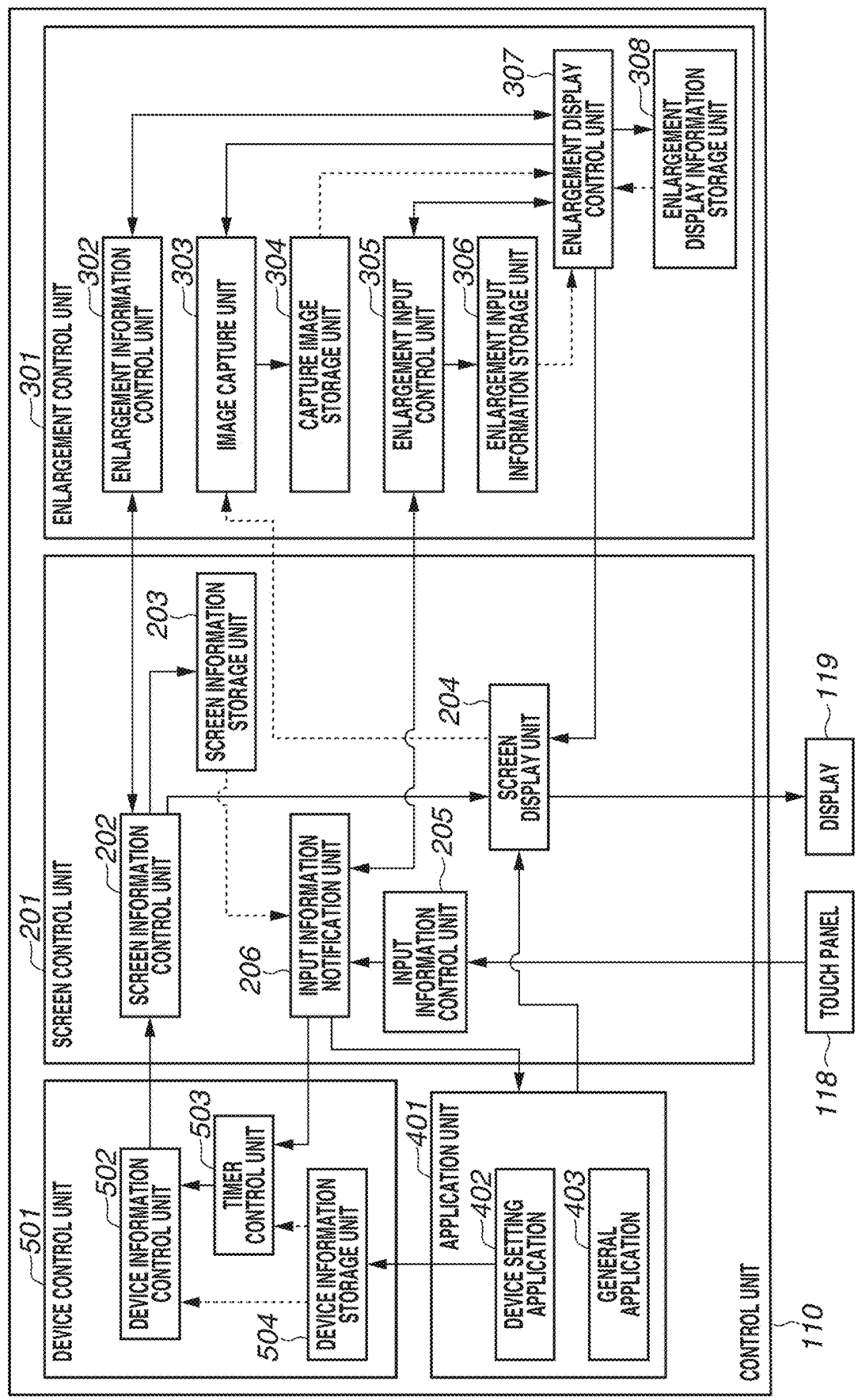
FIG. 2 is a functional block diagram of a control unit.

FIG. 2 is a functional block diagram illustrating the functions for display control realized by the control unit 110 in the information processing apparatus 101. The CPU 111 reads and executes a computer program from a storage medium such as the ROM 113 or the external memory 120 so that each function is formed, but each function may be configured with hardware devices. A screen control unit 201, an enlargement control unit 301, an application unit 401, and a device control unit 501 are formed in the information processing apparatus 101. By using such functions, the information processing apparatus 101 realizes the enlargement function of enlarging an image display on the display 119. The enlargement function of the information processing apparatus 101 includes two functions, i.e., "entire enlargement function" and "magnifying glass function." The entire enlargement function is displaying an enlarged image on the entire display screen of the display 119. The magnifying glass function is a function of displaying an enlarged image superimposed on a not-enlarged image, on part of the display 119. The enlarged image is displayed in a smaller frame than the display size of the display 119, just as caused by magnifying glass. In the following, the entire enlargement function will be simply called "entire enlargement" and the magnifying glass function will be simply called "magnifying glass."

The screen control unit 201 manages the AP including the enlargement function, and performs processing of transferring image information about an image to be displayed to the display 119, processing of notifying AP of an event corresponding to a user's touch operation on the touch panel 118 and the like. The screen control unit 201 includes a screen information control unit 202, a screen information storage unit 203, a screen display unit 204, an input information control unit 205, and an input information notification unit 206.

The screen information control unit 202 receives an enlargement mode notification that an enlargement mode (enlargement function) is switched, from the device control unit 501, and stores the enlargement mode notification in the screen information storage unit 203. The enlargement mode notification includes information about whether the enlargement function is valid, information about enlargement rate, and information whether entire enlargement or magnifying glass is employed. At the same time, the screen information control unit 202 sends the enlargement mode notification to the enlargement control unit 301, and instructs the screen display unit 204 to switch a display area in response to an instruction from the enlargement control unit 301.

The screen display unit 204 draws an image to be displayed on the display 119, in a display area. The display area includes two display areas with the same display size in which images are drawn, respectively. The screen display unit 204 receives an instruction to switch a display area from the screen information control unit 202, and performs processing of switching a display area to be displayed on the display 119.

Figure 3:
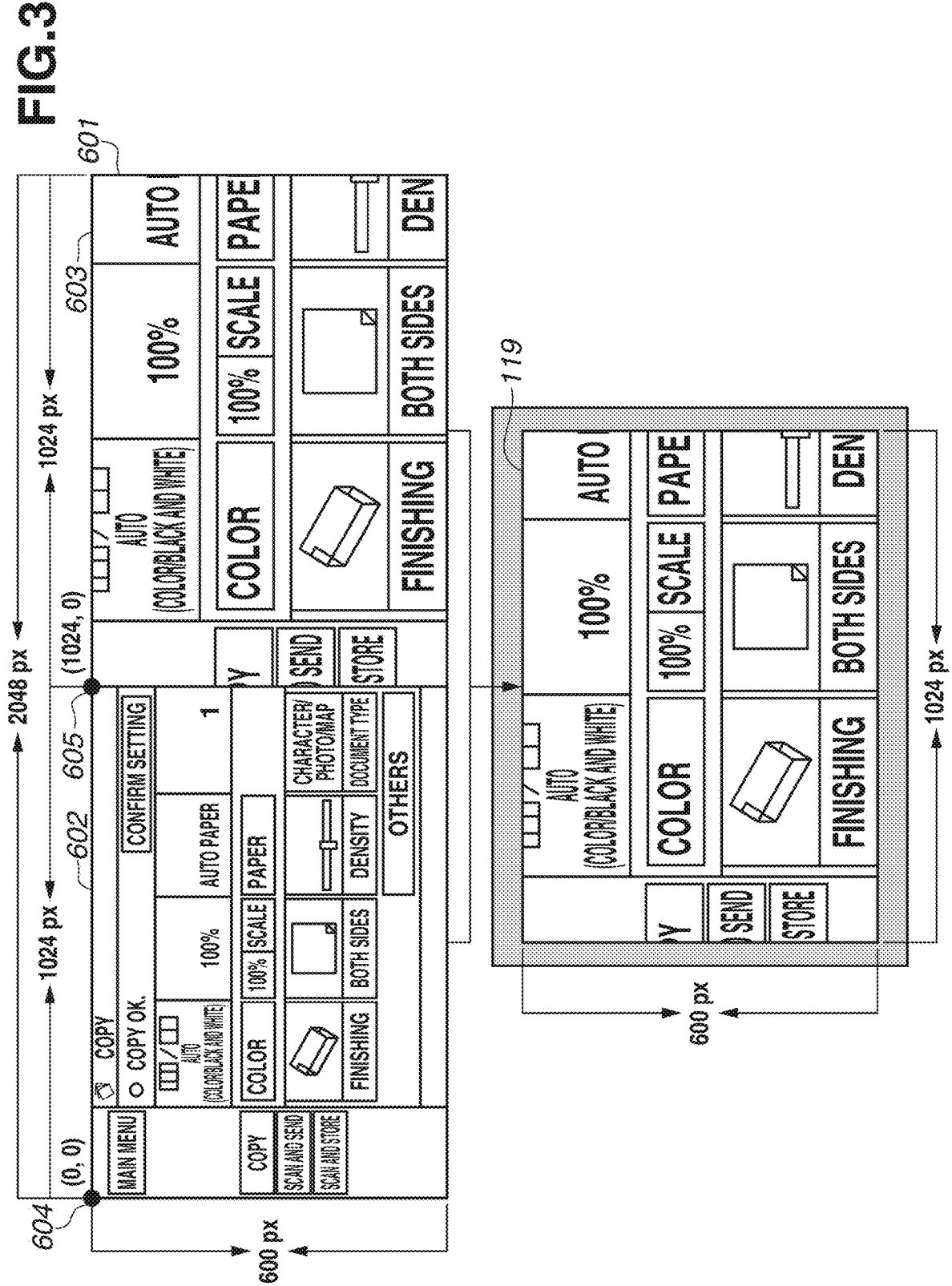
FIG. 3 is an explanatory diagram of display area switch processing.

FIG. 3 is an explanatory diagram of the display area switching processing. FIG. 3 illustrates the display 119 as a final image transfer destination, and a virtual display area 601 in which an image to be transferred to the display 119 is drawn. The virtual display area 601 is provided in the RAM 112, for example. The virtual display area 601 is configured of a normal display area 602 and an expansion display area 603 with the same display size (with a width of 1024 pixels and a height of 600 pixels, for example). The display size is determined depending on the display size of the display 119 (with a width of 1024 pixels and a height of 600 pixels, for example). The display 119 displays thereon either of an image drawn in the normal display area 602 and an image drawn in the expansion display area 603 of the virtual display area 601.

The screen display unit 204 draws an image with the X coordinate "0" and the Y coordinate "0" of a start coordinates 604 as a start point in the normal display area 602. An image drawn in the normal display area 602 is generated by the application unit 401. The screen display unit 204 draws an image with the X coordinate "1024" and the Y coordinate "0" of a start coordinates 605 as a start point in the expansion display area 603. An image drawn in the expansion display area 603 is generated in an enlargement display control unit 307. That is, an AP execution image generated by executing the AP in the application unit 401 is drawn in the normal display area 602, and an enlarged image of the execution image generated in the enlargement control unit 301 is drawn in the expansion display area 603. In the example of FIG. 3, a copy setting screen generated by a copy application is drawn in the normal display area 602. An enlarged image in which part of the copy setting screen is enlarged is displayed in the expansion display area 603.

The screen display unit 204 transfers either one of an image drawn in the normal display area 602 and an image drawn in the expansion display area 603 to the display 119 in response to a display area switching instruction from the screen information control unit 202. FIG. 3 illustrates that the enlargement function is valid and an image in the expansion display area 603 is transferred to and displayed on the display 119.

The input information control unit 205 analyzes a control signal according to a user's operation on the touch panel 118, transforms the control signal into a form of AP-processable event information, and sends the event information to the input information notification unit 206. The event information indicates an operation or state on the touch panel 118, and includes coordinate information about a touched position.

The input information notification unit 206 receives the event information from the input information control unit 205. The input information notification unit 206 refers to the enlargement mode notification stored in the screen information storage unit 203 thereby to send the event information to the application unit 401 when the enlargement function is invalid or to send the event information to the enlargement control unit 301 when the enlargement function is valid. Further, the input information notification unit 206 determines that the touch panel 118 is operated when the event information is received, and instructs a timer control unit 503 described below to reset a timer.

The enlargement control unit 301 captures an image drawn by the application unit 401 in the normal display area 602, and enlarges and draws the captured image in the expansion display area 603. The enlargement control unit 301 includes an enlargement information control unit 302, an image capture unit 303, a captured image storage unit 304, an enlargement input control unit 305, an enlargement input information storage unit 306, the enlargement display control unit 307, and an enlargement display information storage unit 308.

The enlargement information control unit 302 receives an enlargement mode notification from the screen information control unit 202, and sends the received enlargement mode notification to the enlargement display control unit 307. The enlargement information control unit 302 determines whether the enlargement function is valid based on the enlargement mode notification, and instructs the screen information control unit 202 to switch a display area depending on a determination result.

The image capture unit 303 captures an image drawn by the screen display unit 204 in the normal display area 602 in response to an instruction from the enlargement display control unit 307, and stores the captured image in the captured image storage unit 304.

The enlargement input control unit 305 receives the event information from the input information notification unit 206 and stores the received event information in the enlargement input information storage unit 306, and notifies the reception of the event information to the enlargement display control unit 307. Event information stored in the enlargement input information storage unit 306 includes a type of event such as Touch-down, Touch-up or Move, and position coordinates indicating a touched position. As for event information, items of event information based on a plurality of touched positions may be stored as one piece of event information.

The enlargement display control unit 307 mainly performs the following three processings.

When a notification is received from the enlargement input control unit 305, the enlargement display control unit 307 acquires the event information stored in the enlargement input information storage unit 306 and the information stored in the enlargement display information storage unit 308. The enlargement display information storage unit 308 stores therein enlargement display information such as enlargement rate for entire enlargement function, display position coordinate information about entire image, enlargement rate for magnifying glass, and display position coordinate information about the magnifying glass. The enlargement display control unit 307 newly calculates an enlargement rate or display position coordinates by use of the acquired enlargement display information, and updates the content in the enlargement display information storage unit 308. The display position coordinates for magnifying glass and entire enlargement will be described below.

The enlargement display control unit 307 always monitors the enlargement display information storage unit 308. If the enlargement function is valid, the enlargement display control unit 307 instructs the image capture unit 303 to capture an image and acquires a captured image stored in the captured image storage unit 304. The enlargement display control unit 307 enlarges or downsizes the acquired captured image based on an enlargement rate stored in the enlargement display information storage unit 308, and gives a drawing instruction to the screen display unit 204 according to the display position coordinate information about the magnifying glass. If the enlargement function is invalid, the enlargement display control unit 307 does not perform the screen display control.

The enlargement display control unit 307 receives an enlargement mode notification from the enlargement information control unit 302, and instructs the enlargement information control unit 302 to switch a display area depending on whether the enlargement function is valid. When it is determined that the enlargement function is invalid, the enlargement display control unit 307 instructs the enlargement information control unit 302 to switch to the normal display area 602. When it is determined that the enlargement function is valid, the enlargement display control unit 307 instructs the enlargement information control unit 302 to switch to the expansion display area 603.

The application unit 401 is a group of applications configured to generate images to be displayed on the display 119 and operated on the touch panel 118. The application unit 401 includes a device setting application 402 and a general application 403. The application unit 401 sends a drawing instruction to the screen display unit 204 so that an image is drawn in the normal display area 602.

The device setting application 402 is AP configured to set various setting values of the information processing apparatus 101 main body according to a use environment mainly by an administrator as a user. For example, the device setting application 402 is used for the settings such as language setting, power saving setting, network setting, and enlargement function setting. The operations of the information processing apparatus 101 are determined according to the setting values. According to the present exemplary embodiments, whether the entire enlargement function is valid/invalid, and whether the magnifying glass function is valid/invalid are set as the enlargement function setting. The entire enlargement function and the magnifying glass function are in an exclusive relationship, and only one of them can be set as valid. For example, when the entire enlargement function is set as valid, the magnifying glass function is invalid. The information included in the enlargement mode notification is set according to the enlargement function setting by the device setting application 402. The general application 403 is AP used by general users and corresponding to the functions of the information processing apparatus 101. Only one general application 403 is illustrated to simplify the description, but a plurality of general applications 403 may be present. The general applications 403 may employ various APs such as copying, scanning, sending scanned data, storing (box) scanned data, and printing.

The device control unit 501 monitors and manages the states of the information processing apparatus 101. The device control unit 501 includes a device information control unit 502, the timer control unit 503, and a device information storage unit 504.

The device information control unit 502 always monitors the device information storage unit 504, and sends updated content to the screen information control unit 202 when it is detected that the setting values are updated by the device setting application 402. For example, when the entire enlargement function or the magnifying glass function is set as valid by the device setting application 402, the device information control unit 502 generates and sends an enlargement mode notification to the screen information control unit 202. The device information storage unit 504 stores the setting values set by the device setting application 402, and additionally stores a transition time to the power saving mode or an auto-clear time.

The timer control unit 503 manages the power saving mode to which the information processing apparatus 101 transitions when it has not been operated for a certain period of time, or manages auto-clear that returns an image halfway operated by the user to a default image. Specifically, the timer control unit 503 counts up a time, and compares it with a transition time to the power saving mode or an auto-clear time stored in the device information storage unit 504. When the transition time or the auto-clear time elapses as a result of the comparison, the timer control unit 503 makes a request for the power saving mode or auto-clear, to the device information control unit 502. When the notification request is received from the timer control unit 503, the device information control unit 502 notifies the screen information control unit 202 that the processing has entered the auto-clear or the power saving mode. When instructed to reset the timer from the input information notification unit 206, the timer control unit 503 resets the own timer, and delays the processing such as power saving mode or auto-clear.

<Magnifying Glass>

Figure 4:
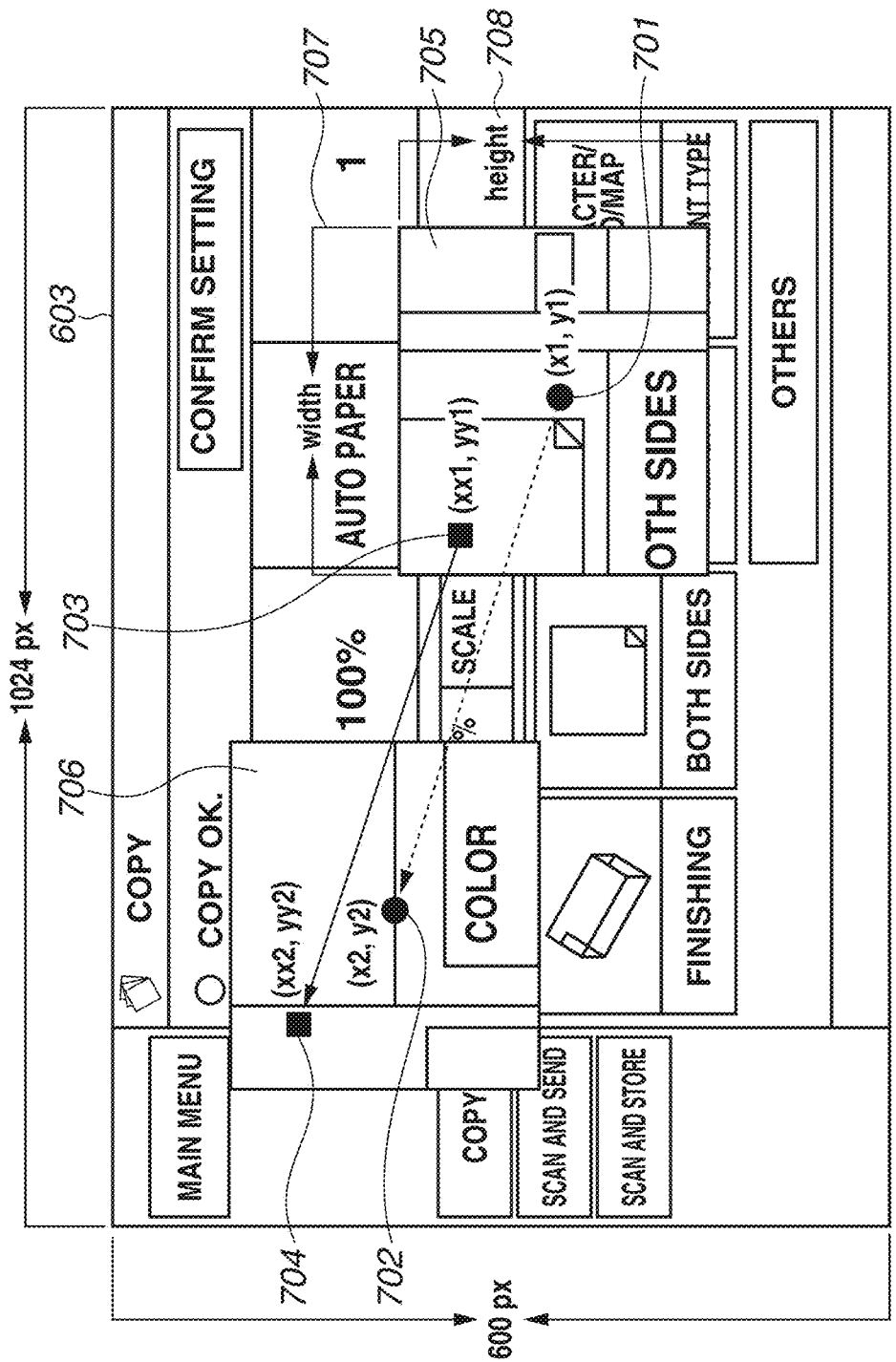
FIG. 4 is an explanatory diagram of a magnifying glass frame.

FIG. 4 is an explanatory diagram of a magnifying glass frame displayed on the display 119 when the magnifying glass function is set as valid. An image in the expansion display area 603 is presented on display 119. A magnifying glass frame 705 is smaller than the expansion display area 603 and is displayed within the expansion display area 603, and a display position thereof is represented by center coordinates 701 (x1, y1). The magnifying glass frame 705 is movable within the expansion display area 603 according to a user's drag operation. In FIG. 4, the magnifying glass frame 705 is moved to be a magnifying glass frame 706 having center coordinates 702 (x2, y2).

An image in the expansion display area 603 is drawn with upper left coordinates (1024, 0) in the expansion display area 603 as an origin. The image is the same as an image drawn in the normal display area 602, and is not enlarged. A magnifying glass image within the magnifying glass frame 705 is drawn with upper left coordinates (0, 0) in the magnifying glass frame 705 as an origin. The center coordinates 701 of the magnifying glass frame 705 is represented by the upper left coordinates (1024, 0) in the expansion display area 603 as an origin. A magnifying glass image drawn in the magnifying glass frame 705 is an image drawn in the expansion display area 603 at the same coordinates as the center coordinates 701 of the magnifying glass frame 705, which is enlarged according to an enlargement rate of the magnifying glass and part of the enlarged image is clipped. Center coordinates 701, width 707, and height 708 of the magnifying glass frame 705 are stored as the display position coordinate information about the magnifying glass frame 705 in the enlargement display information storage unit 308.

The user makes Touch-down at a movement start point 703 (xx1, yy1), makes Move, and Touch-up at a movement end point 704 (xx2, yy2) in order to move the magnifying glass frame 705 to the magnifying glass frame 706 on the display 119. The coordinates of events in a series of operations such as Touch-down, Move, and Touch-up are notified as coordinates of the virtual display area 601 including the width of the normal display area 602 from the touch panel 118 to the screen control unit 201.

The center coordinates 702 of the magnifying glass frame 706 after movement is obtained so that the magnifying glass frame 706 displays therein a magnifying glass image in which an image drawn in the expansion display area 603 at the same coordinates as the center coordinates 702 is enlarged and part of the enlarged image is clipped. The center coordinates 702 (x2, y2) of the magnifying glass frame 706 after movement can be obtained as follows, for example. The newly-obtained display position coordinate information is stored in the enlargement display information storage unit 308.

$$x2 = x1 + (xx2 - xx1)$$

$$y2 = y1 + (yy2 - yy1)$$

FIG. 4 illustrates only the magnifying glass frame 705 at a movement start point and the magnifying glass frame 706 at a movement end point, but a plurality of movement points are actually present during a Move event between the movement start point and the movement end point. The movement points during the Move event are similarly subjected to coordinate calculation and magnifying glass display. The processing for coordinate calculation of the magnifying glass and display of the magnifying glass are performed by the enlargement display control unit 307.

<Entire Enlargement>

Figure 5:
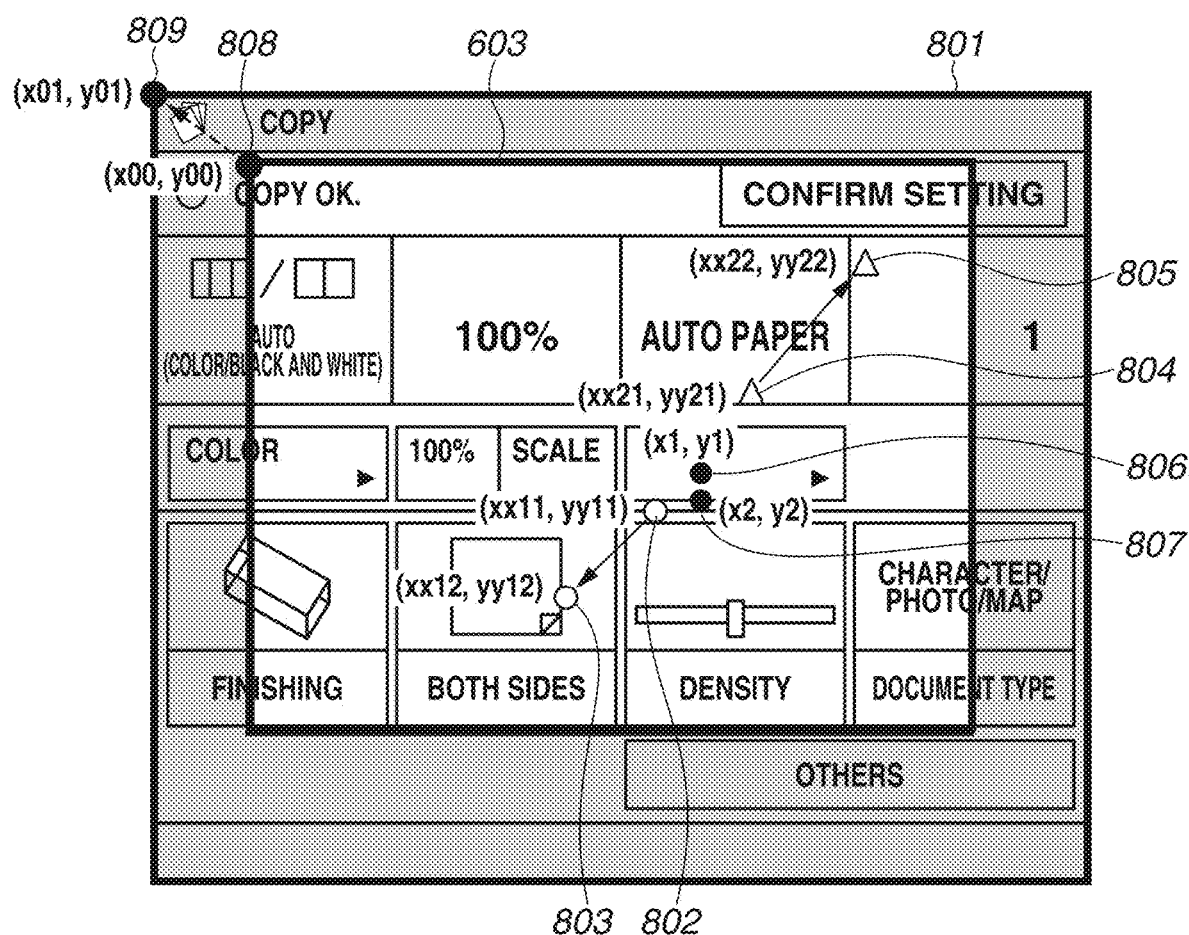
FIG. 5 is an explanatory diagram of entirely-enlarged display.

FIG. 5 is an explanatory diagram of entire enlargement display. An entirely-enlarged image is drawn in the expansion display area 603 and is displayed on the display 119.

An enlarged image 801 in which an image displayed in the normal display area 602 is enlarged at a specific enlargement rate is clipped in size displayable on the display 119 and is drawn in the expansion display area 603. For example, an image in the normal display area 602 is subjected to a pinch-out operation while being displayed on the display 119 so that the enlarged image 801 is acquired.

In the example of FIG. 5, an origin 809 of the enlarged image 801 is (−50, −30) relative to the origin of the original image. An image in the range from the position (50, 30) relative to the origin 809 of the enlarged image 801 to a width of 1024 pixels and a height of 600 pixels of the expansion display area 603 is clipped. The clipped image is drawn in the expansion display area 603.

An enlargement rate and an origin 809 of the enlarged image 801 are obtained as follows in a case where the image is enlarged by a pinch-out operation. Two points on the touch panel 118 are touched in a pinch-out operation. The touch position of the first point moves from a pinch start coordinates 802 at the start of the pinch operation to a pinch end coordinates 803 at the end of the pinch operation. The touch position of the second point moves from a pinch start coordinates 804 at the start of the pinch operation to a pinch end coordinates 805 at the end of the pinch operation. The coordinates are input as information including the width of the normal display area 602 of FIG. 3 from the touch panel 118 into the control unit 110.

In the pinch-out operation, a distance D2 between the pinch end coordinates 803 and the pinch end coordinates 805 is longer than a distance D1 between the pinch start coordinates 802 and the pinch start coordinates 804. Therefore, the control unit 110 determines that the pinch-out operation gives an instruction to enlarge the image. The distances D1 and D2 are expressed in the following equations. Where the pinch start coordinates 802 as (xx11, yy11), the pinch start coordinates 804 as (xx21, yy21), the pinch end coordinates 803 as (xx12, yy12), and the pinch end coordinates 805 as (xx22, yy22), $$D1 = \sqrt{((xx21-xx11)^2 + (yy21-yy11)^2)}$$

$$D2 = \sqrt{((xx22-xx12)^2 + (yy22-yy12)^2)}$$

Assuming a current enlargement rate R1 (generally 100%) of an image displayed in the normal display area 602 and the distances D1 and D2, an enlargement rate R2 of an image by the pinch operation is expressed by the following equation. The enlargement display control unit 307 enlarges the image at the new enlargement rate R2.

$$R2 = R1 \times D2/D1$$

Coordinates (x01, y01) of the origin 809 of the enlarged image 801 are obtained using the new enlargement rate R2. In the present case, an image is enlarged with a center point coordinates of two points for the pinch operation as a start point. When the center point 806 at the start of pinch and the center point 807 at the end of pinch are at the same position, coordinates (x1, y1) of the center point are expressed by the following equations subtracting the width of the normal display area 602.

$$x1 = (xx11 - 1024 + xx21 - 1024)/2$$

$$y1 = (yy11 + yy21)/2$$

A distance between the coordinates (x00, y00) of the origin 808 of an image before enlargement and the center point is expressed by the following equations.

(distance between origin of enlarged image and center point) = $x1 - x00$ (distance between origin of enlarged image and center point) = $y1 - y00$ Based on these equations, coordinates (x01, y01) of the origin 809 of the enlarged image 801 is expressed in the following equations.

$$x01 = x1 - (x1 - x00) \times R2$$

$$y01 = y1 - (y1 - y00) \times R2$$

The center point at the start of pinch is rarely the same as the center point at the end of pinch, and a slight deviation actually occurs therebetween. Therefore, the amounts of movement of the center point coordinates are calculated, and a position of the origin 809 of the enlarged image 801 is obtained in consideration of the amounts of movement. The center point coordinates (x1, y1) and (x2, y2) of the center point 806 at the start of pinch and the center point 807 at the end of pinch are expressed by the following equations, respectively.

$$x1=(xx11-1024+xx21-1024)/2$$

$$y1=(yy11+yy21)/2$$

$$x2=(xx12-1024+xx22-1024)/2$$

$$y2=(yy12+yy22)/2$$

The amount of movement (Xd, Yd) from the center point 806 to the center point 807 is expressed by the following equations.

$$Xd=x2-x1$$

$$Yd=y2-y1$$

From the above, coordinates (x01, y01) of the origin 809 of the enlarged image 801 is expressed by the following equations.

$$x01=x1-(x1-x00)\times R2+Xd$$

$$y01=y1-(y1-y00)\times R2+Yd$$

An image may be enlarged not only by a pinch operation but also by a Move operation. In this case, the center point 806 is a start point and the center point 807 is an end point for a Move operation, for example. The amount of movement (Xd, Yd) between the center points 806 and 807 is the amount of movement caused by the Move operation, so that coordinates of the origin 809 of the enlarged image 801 can be calculated, and an area of the image to be displayed in the expansion display area 603 can be determined.

The coordinates indicating the positions from a start position of an operation to an end position thereof are continuously input from the touch panel 118 into the control unit 110 during both a pinch operation and a Move operation. The control unit 110 continuously makes coordinate calculations and displays an entire enlarged image during that time. The enlargement display control unit 307 calculates coordinate position information and displays the entire enlarged image, and stores the enlargement display information including an enlargement rate, origin coordinates of the enlarged image, width of the enlarged image, and height of the enlarged image in an enlargement display information storage unit 308.

The expansion display area 603 is provided on the right side of the normal display area 602 in the present exemplary embodiments, but may be provided below the normal display area 602. In this case, the expansion display area 603 is provided at the coordinates (0, 600). Also as for an operation in a touch event, a value to which 600 pixels are added in the Y direction is input as coordinates indicating the operation position, from the touch panel 118 into the control unit 110. Any other calculation equations that enables obtaining coordinates in the similar way may be employed in the present exemplary embodiments.

Image display processing on the display 119 performed by the information processing apparatus 101 with the above structure will be described.

<Switching of Image by Enlargement Function>

A first exemplary embodiment will be described below.

FIG. 6 is a flowchart illustrating processing of switching an image displayed on the display 119 depending on whether the enlargement function (entire enlargement or magnifying glass) is valid.

When an enlargement mode notification is received from the device information control unit 502 in step S101, in step S102, the screen information control unit 202 stores the received enlargement mode notification into the screen information storage unit 203. In step S103, the screen information control unit 202 sends the received enlargement mode notification to the enlargement information control unit 302.

In step S104, the enlargement information control unit 302 receives the enlargement mode notification sent from the screen information control unit 202, and sends the received enlargement mode notification to the enlargement display control unit 307. In step S105, the enlargement display control unit 307 receives the enlargement mode notification sent from the enlargement information control unit 302 and stores the received enlargement mode notification in the enlargement display information storage unit 308.

In step S106, the enlargement display control unit 307 determines whether the enlargement function has become valid by the enlargement mode notification. When the enlargement function is invalid (NO in step S106), in step S107, the enlargement display control unit 307 requests the screen information control unit 202 to switch the image displayed on the display 119 to the image in the normal display area 602 via the enlargement information control unit 302. When the enlargement function is valid (YES in step S106), in step S108, the enlargement display control unit 307 requests the screen information control unit 202 to switch the image displayed on the display 119 to the image in the expansion display area 603 via the enlargement information control unit 302.

The screen information control unit 202 receives the image switch request from the enlargement information control unit 302 in step S109, and determines whether switch to the image in the normal display area 602 is requested in step S110. When the request is to switch to the image in the normal display area 602 (YES in step S110), in step S111, the screen information control unit 202 switches the image displayed on the display 119 to the image in the normal display area 602 via the screen display unit 204. When the request is to switch to the image in the expansion display area 603 (NO in step S110), in step S111, the screen information control unit 202 switches the image displayed on the display 119 to the image in the expansion display area 603 via the screen display unit 204.

As described above, an image in the normal display area 602 and an image in the expansion display area 603 are switched to determine the image to be presented on the display 119 in response to reception of the enlargement mode notification indicating that the enlargement function is switched, from the device control unit 501.

<Sending of Event to Enlargement Function>

Figure 7A:
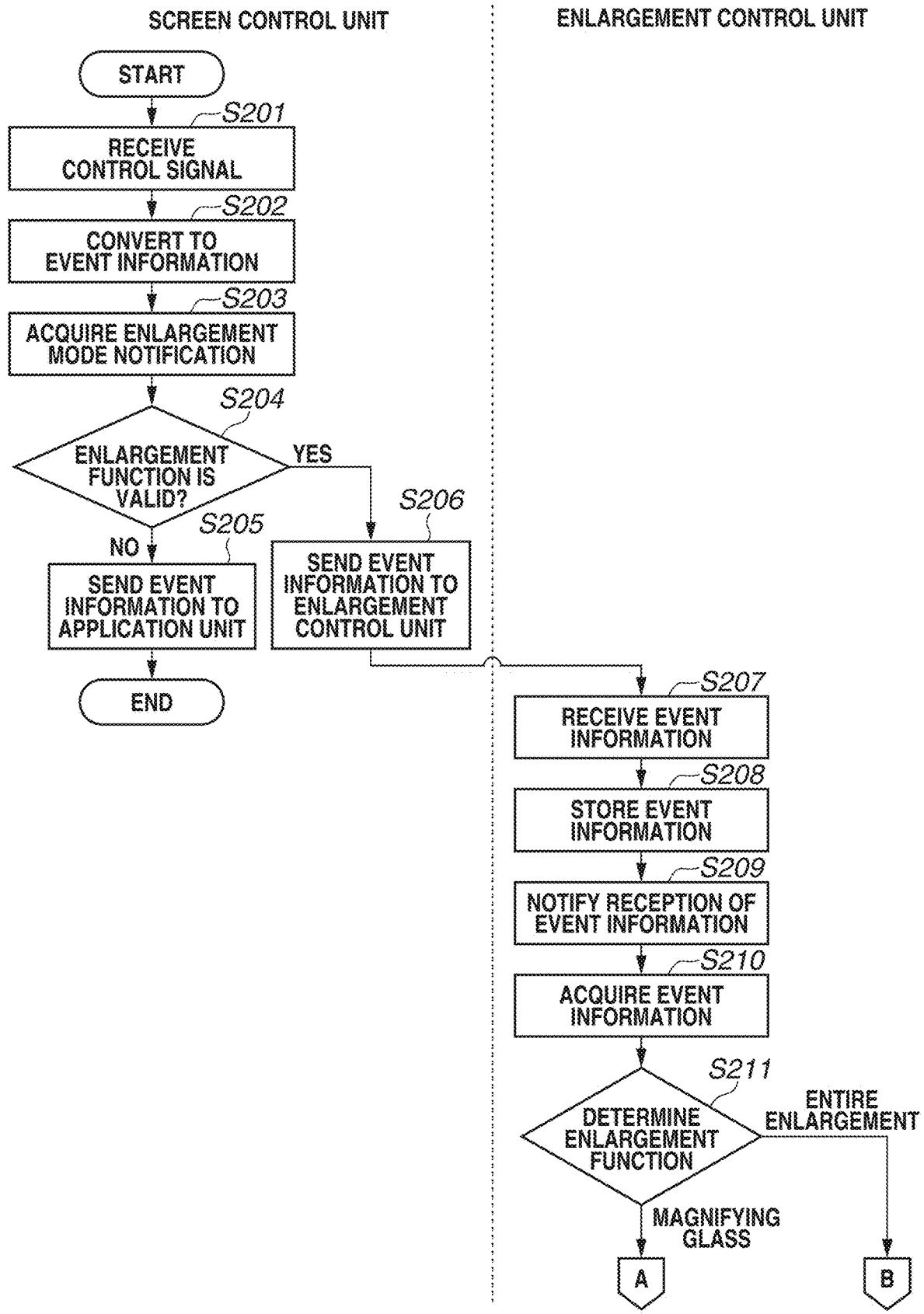
FIGS. 7A to 7C are flowcharts of event processing.
Figure 7B:
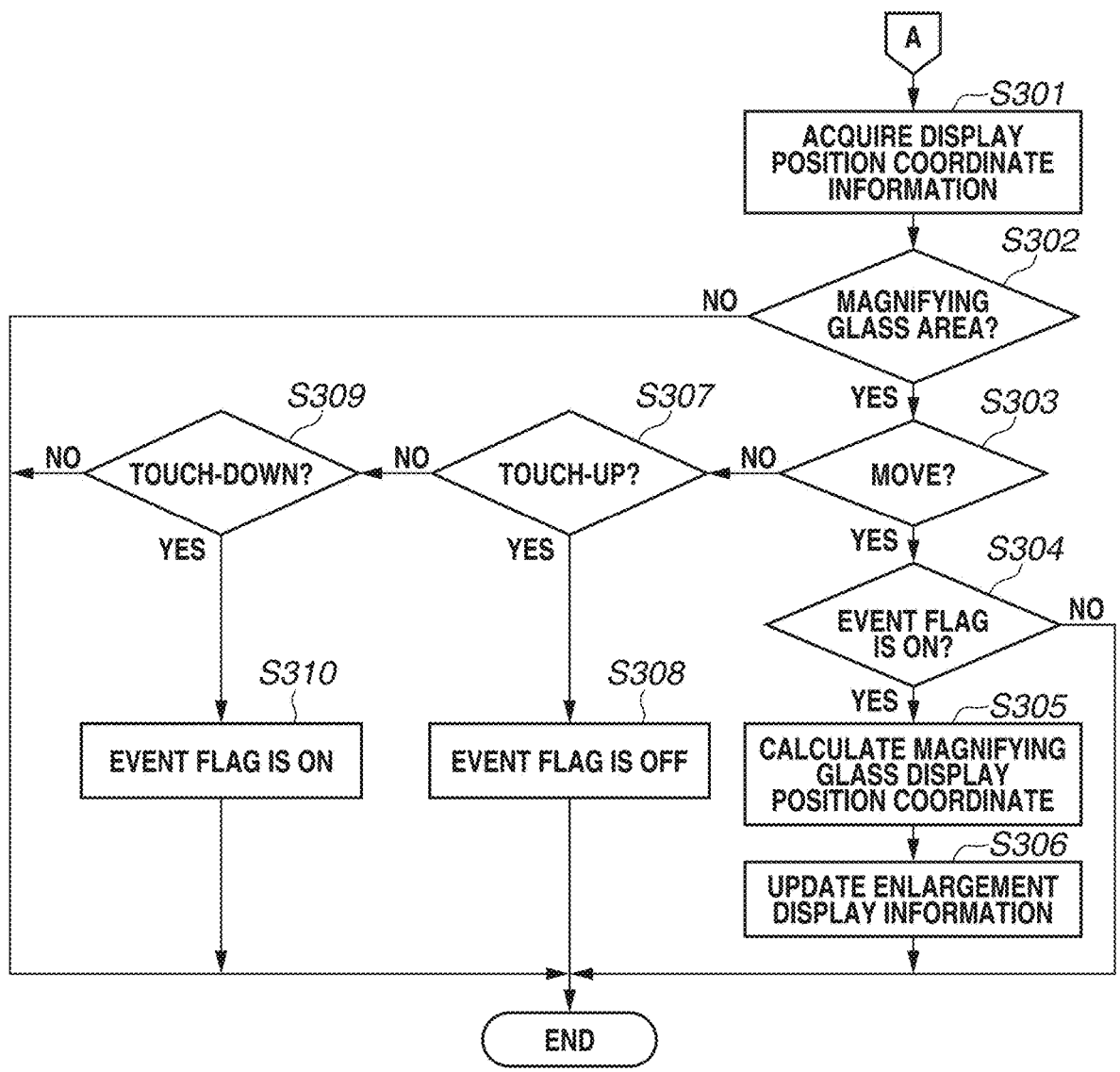
Figure 7C:
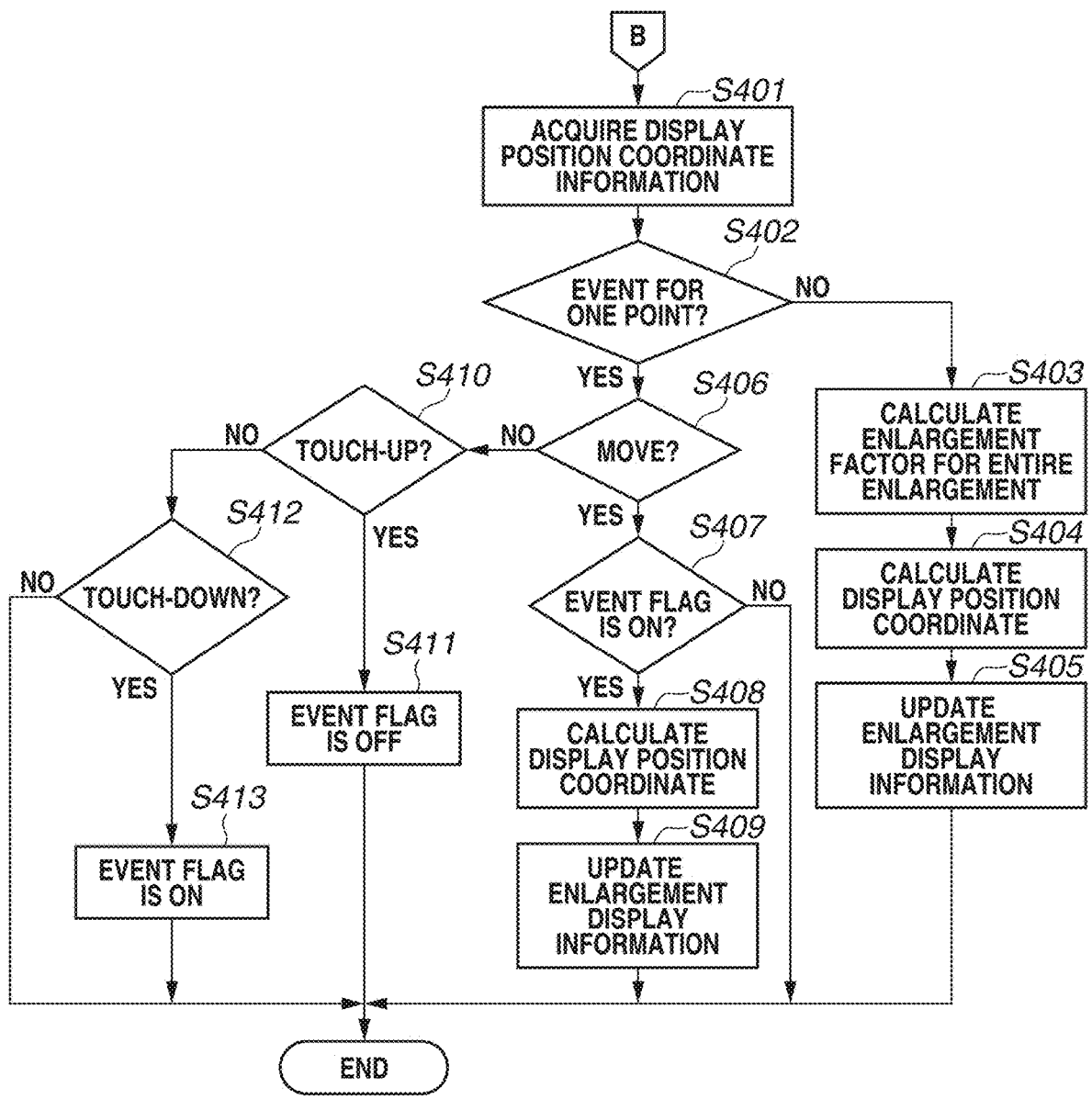

FIGS. 7A to 7C are the flowcharts illustrating event processing in response to input from the touch panel 118 by a user's operation.

The input information control unit 205 receives a control signal according to a user's operation on the touch panel 118 in step S201, and converts the received control signal into event information and inputs the event information into the input information notification unit 206 in step S202. The input information notification unit 206 acquires an enlargement mode notification stored in the screen information storage unit 203 in step S203, and determines whether the enlargement function is valid according to the enlargement mode notification in step S204. When the enlargement function is invalid (NO in step S204), in step S205, the input information notification unit 206 sends the event information to the application unit 401. The application unit 401 performs processing according to the event information, and terminates the processing. For example, when event information is received indicating that a paper select button is selected on the copy setting screen of the copy application, the copy application switches the screen to the paper select screen (not illustrated). When the enlargement function is valid (YES in step S204), in step S206, the input information notification unit 206 sends the event information to the enlargement input control unit 305.

In step S207, the enlargement input control unit 305 receives the event information from the input information notification unit 206. The enlargement input control unit 305 stores the received event information in the enlargement input information storage unit 306 in step S208, and notifies that the event information is input, to the enlargement display control unit 307 in step S209.

In step S210, the enlargement display control unit 307 acquires the event information from the enlargement input information storage unit 306 in response to the notification from the enlargement input control unit 305. In step S211, the enlargement display control unit 307 determines whether the entire enlargement function or the magnifying glass function is valid based on the enlargement mode notification stored in the enlargement display information storage unit 308. When the magnifying glass function is valid (magnifying glass in step S211), the enlargement display control unit 307 performs event processing for magnifying glass (see FIG. 7B). When the entire enlargement function is valid (entire enlargement in step S211), the enlargement display control unit 307 performs event processing for entire enlargement of image (see FIG. 7C).

FIG. 7B is a flowchart illustrating the event processing for magnifying glass. Here, processing of moving the magnifying glass frame to a predetermined position by a user's drag operation will be described. In step S301, the enlargement display control unit 307 acquires display position coordinate information about the magnifying glass from the enlargement display information storage unit 308. In step S302, the enlargement display control unit 307 determines whether the touch position acquired from the event information is within the display area of the magnifying glass frame obtained from the acquired display position coordinate information. When the touch position is not within the display area of the magnifying glass frame (NO in step S302), the enlargement control unit 301 terminates the event processing for magnifying glass.

When the touch position is within the display area of the magnifying glass frame (YES in step S302), in step S303, the enlargement display control unit 307 determines whether the event information indicates Move. When the event information indicates Move (YES in step S303), in step S304, the enlargement display control unit 307 determines whether an event flag is ON. The event flag is ON when Touch-down is performed on the touch panel 118 and OFF when Touch-up is performed on the touch panel 118. That is, the event flag indicates a touched state on the touch panel 118. The event flag is set OFF in the initial state. When the event flag is OFF (NO in step S304), the enlargement control unit 301 terminates the event processing for magnifying glass. When the event flag is ON (YES in step S304), in steps S305 and S306, the enlargement display control unit 307 calculates a display position coordinates of the magnifying glass frame, and updates the enlargement display information in the enlargement display information storage unit 308 according to a calculation result.

When the event information does not indicate Move (NO in step S303), in step S307, the enlargement display control unit 307 determines whether the event information indicates Touch-up. When the event information indicates Touch-up (YES in step S307), in step S308, the enlargement display control unit 307 sets the event flag OFF. When the event information does not indicate Touch-up (NO in step S307), in step S309, the enlargement display control unit 307 determines whether the event information indicates Touch-down. When the event information indicates Touch-down (YES in step S309), in step S310, the enlargement display control unit 307 sets the event flag ON. When the event information does not indicate Touch-down (NO in step S309), the enlargement control unit 301 terminates the event processing for magnifying glass.

The flowchart of FIG. 7B will be described by way of specific examples. When the user performs a drag operation on the magnifying glass frame, Touch-down is detected by first touching on the magnifying glass frame (YES in step S309), and in step S310, the event flag is set ON. Subsequently, Move is detected (YES in step S303) and the event flag is set ON (YES in step S304), so that in steps S305 and S306, a display position coordinates of the magnifying glass frame is calculated and the enlargement display information is updated. Thereafter, when the user releases the finger from the magnifying glass frame, Touch-up is detected (YES in step S307), and in step S308, the event flag is set OFF.

FIG. 7C is a flowchart illustrating the event processing for entire enlargement. In a present case, an image displayed on the display 119 is enlarged by a user's pinch operation and then a display position is moved by a subsequent drag operation. In step S401, the enlargement display control unit 307 acquires display position coordinate information about the entire enlargement from the enlargement display information storage unit 308. In step S402, the enlargement display control unit 307 which has acquired the display position coordinate information determines whether the event information includes only coordinate information about one point.

When the event information is not about one point (NO in step S402), in step S403, the enlargement display control unit 307 determines that a touch operation is performed on two or more points, and calculates an entire enlargement rate using a plurality of pieces of coordinate information according to the event information. In step S404, the enlargement display control unit 307 calculates a display position coordinates using of a plurality of pieces of coordinate information. In step S405, the enlargement display control unit 307 updates the enlargement display information in the enlargement display information storage unit 308 based on the calculated enlargement rate and display position coordinates.

When the event information is about one point (YES in step S402), in step S406, the enlargement display control unit 307 determines whether the event information indicates Move. When the event information indicates Move (YES in step S406), in step S407, the enlargement display control unit 307 determines whether the event flag is ON. When the event flag is OFF (NO in step S407), the enlargement control unit 301 terminates the event processing for magnifying glass. When the event flag is ON (YES in step S407), in step S408, the enlargement display control unit 307 calculates a display position coordinates for the entire enlargement. In step S409, the enlargement display control unit 307 updates the enlargement display information in the enlargement display information storage unit 308 based on the calculated display position coordinates.

When the event information does not indicate Move (NO in step S406), in step S410, the enlargement display control unit 307 determines whether the event information indicates Touch-up. When the event information indicates Touch-up (YES in step S410), in step S411, the enlargement display control unit 307 sets the event flag OFF. When the event information does not indicate Touch-up (NO in step S410), in step S412, the enlargement display control unit 307 determines whether the event information indicates Touch-down. When the event information indicates Touch-down (YES in step S412), in step S413, the enlargement display control unit 307 sets the event flag ON. When the event information does not indicate Touch-down (NO in step S412), the enlargement control unit 301 terminates the event processing for entire enlargement.

The flowchart of FIG. 7C will be described by way of specific examples. Since the user first performs a pinch-out operation for performing entire enlargement, event information including coordinate information about two points is detected (NO in step S402). Then, an enlargement rate for the entire enlargement is calculated in step S403, display position coordinates are calculated in step S404, and the enlargement display information are updated in step S405. Subsequently, when the user performs a drag operation on the enlarged screen to move a display position, Touch-down is first detected (YES in step S412), and in step S413, the event flag is set ON. Subsequently, Move is detected (YES in step S406) and the event flag is set ON (YES in step S407), so that in steps S408 and S409, display position coordinates for the entire enlargement are calculated and the enlargement display information is updated. Thereafter, when the user releases the finger from the touch panel 118, Touch-up is detected (YES in step S307), and in step S308, the event flag is set OFF.

<Captured Image Processing>

Figure 8:
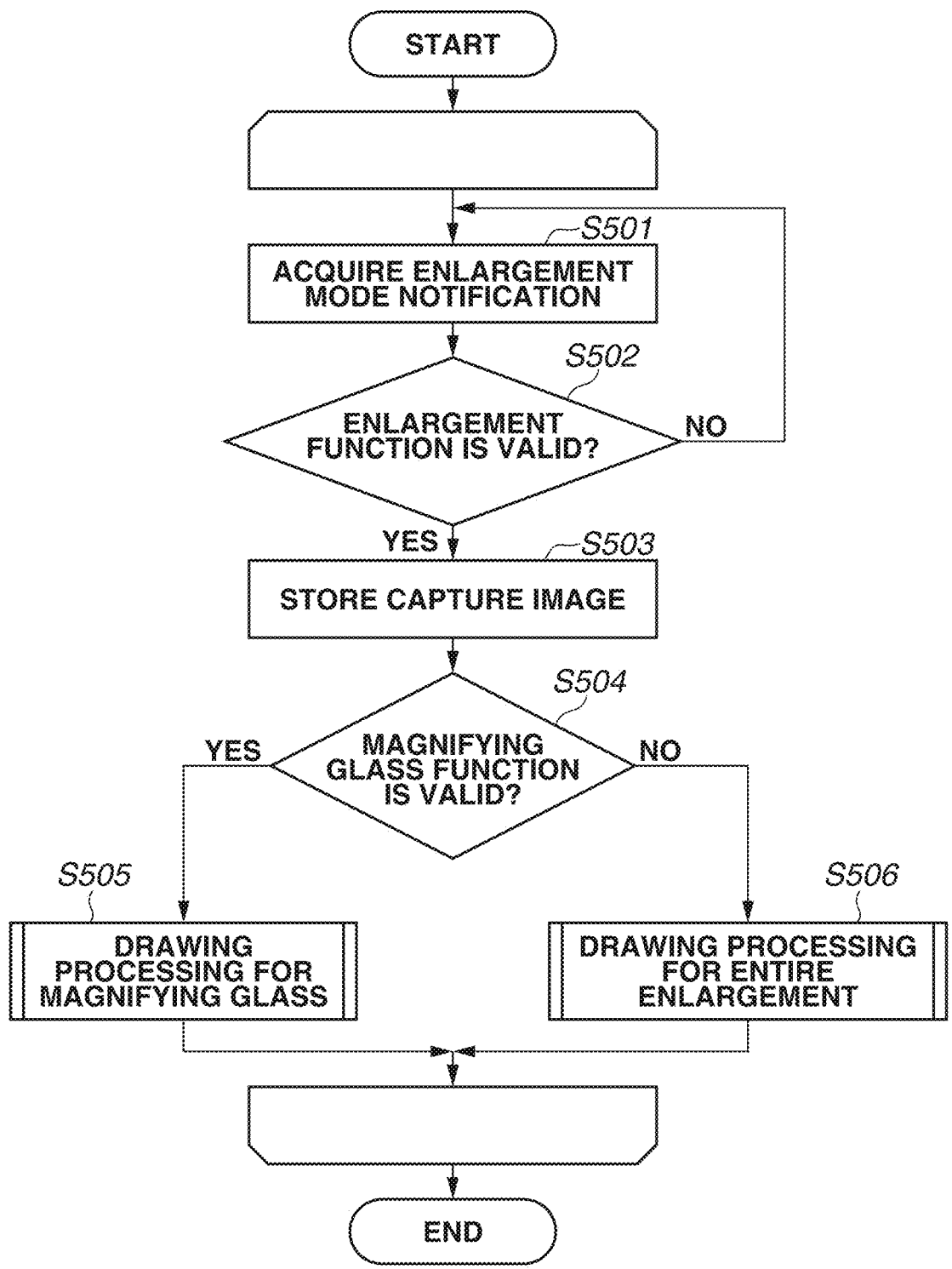
FIG. 8 is a flowchart of captured image drawing processing.

FIG. 8 is a flowchart illustrating processing of acquiring and drawing a captured image in the expansion display area 603 when the enlargement function is valid. The processing is started when the enlargement function is valid, and is performed at constant time intervals until the information processing apparatus 101 is shut down.

In step S501, the enlargement display control unit 307 acquires the enlargement mode notification stored in the enlargement display information storage unit 308. In step S502, the enlargement display control unit 307 determines whether the enlargement function is valid based on the enlargement mode notification. When the enlargement function is invalid (NO in step S502), the enlargement display control unit 307 acquires the enlargement mode notification again. The enlargement display control unit 307 repeatedly performs the processing until the enlargement function is valid.

When the enlargement function is valid (YES in step S502), the enlargement display control unit 307 causes the image capture unit 303 to capture an image drawn in the normal display area 602. In step S503, the image capture unit 303 stores the captured image in the captured image storage unit 304.

In step S504, the enlargement display control unit 307 determines whether the entire enlargement function or the magnifying glass function is valid based on the enlargement mode notification. When the magnifying glass function is valid (YES in step S504), in step S505, the enlargement display control unit 307 performs the drawing processing for magnifying glass. When the entire enlargement function is valid (NO in step S504), in step S506, the enlargement display control unit 307 performs the drawing processing for entire enlargement.

<Drawing Processing for Magnifying Glass and Drawing Processing for Entire Enlargement>

Figure 9A:
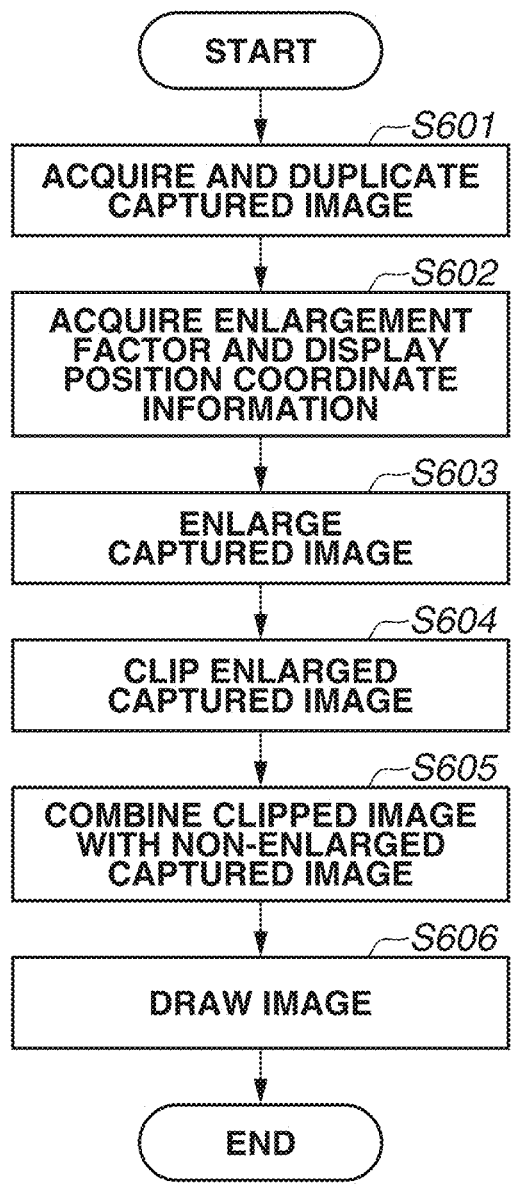
FIGS. 9A and 9B are flowcharts of enlarged image drawing processing.

FIG. 9A is a flowchart illustrating the drawing processing for magnifying glass.

In step S601, the enlargement display control unit 307 acquires and duplicates the captured image stored in the captured image storage unit 304. In step S602, the enlargement display control unit 307 acquires the enlargement rate and the display position coordinate information for the magnifying glass stored in the enlargement display information storage unit 308. In step S603, the enlargement display control unit 307 enlarges the duplicated captured image at the acquired enlargement rate. In step S604, the enlargement display control unit 307 clips the enlarged captured image in a size of the magnifying glass frame based on the display position coordinate information.

In step S605, the enlargement display control unit 307 combines the clipped and enlarged captured image at a position indicated by the display position coordinate information of the not-enlarged captured image. In step S606, the enlargement display control unit 307 draws the combined image in the expansion display area 603 via the screen display unit 204. Then, the screen control unit 201 switches the display to the expansion display area 603 in the processing illustrated in FIG. 6 so that an image in which the clipped part of the enlarged captured image is superimposed on the captured image is displayed on the display 119.

Figure 9B:
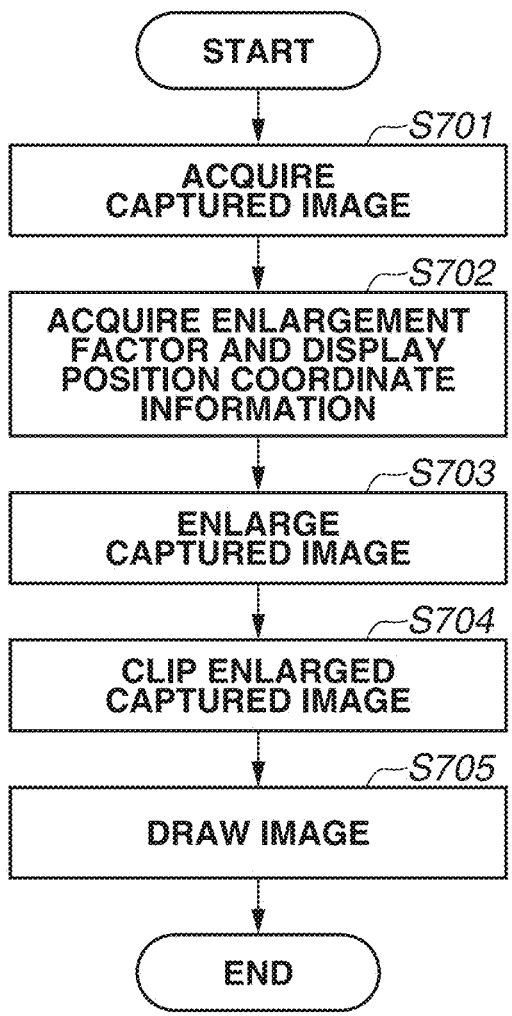

FIG. 9B is a flowchart illustrating the drawing processing for entire enlargement.

In step S701, the enlargement display control unit 307 acquires a captured image stored in the captured image storage unit 304. In step S702, the enlargement display control unit 307 acquires the enlargement rate and the display position coordinate information for the entire enlargement stored in the enlargement display information storage unit 308. In step S703, the enlargement display control unit 307 enlarges the captured image according to the acquired enlargement rate. In step S704, the enlargement display control unit 307 clips the enlarged captured image at the size of the display 119 based on the display position coordinate information. In step S705, the enlargement display control unit 307 draws the clipped image in the expansion display area 603 via the screen display unit 204. The screen control unit 201 switches the display to the expansion display area 603 in the processing illustrated in FIG. 6 so that the clipped part of the enlarged captured image is displayed on the display 119.

As described above, the information processing apparatus 101 according to the present exemplary embodiment can enlarge and display an entire image generated by an application without customizing the OS or system. Further, the information processing apparatus 101 enables magnifying glass display for enlarging and displaying part of an image generated by the application. When the entire enlargement function is valid, the user can enlarge and downsize the entire screen by a pinch operation, and can change a display position of the enlarged image to any position by a drag operation. When the magnifying glass function is valid, the user can move the magnifying glass frame to any position by a drag operation. Thereby, even weak-eyed users can operate the apparatus without impairing its operation, and accessibility is enhanced.

In the above description, when the enlargement function setting is changed by the device setting application 402, the device control unit 501 generates an enlargement mode notification. The generated enlargement mode notification is sent to the enlargement control unit 301 via the screen control unit 201 (FIG. 2 and FIG. 6). When it is determined that the enlargement function is valid based on the enlargement mode notification, the enlargement control unit 301 performs the image capture processing in the normal display area and draws an image in the expansion display area (FIG. 8 and FIGS. 9A and 9B), and switches the display to the expansion display area (FIG. 6). Therefore, when the entire enlargement function is changed from invalid to valid, even before the user performs a pinch-out operation, the image capture processing in the normal display area, the image drawing processing in the expansion display area, and the processing of switching to the expansion display area can be performed. Consequently, an image before enlargement can be captured and the captured image is presented on the display 119.

As a variant, the processing subsequent to image capturing may be performed when a pinch-out operation is performed or when the enlargement rate exceeds a predetermined value (such as 100%) by a pinch-out operation, without performing the processing subsequent to image capturing at the time that the entire enlargement function is valid. In the present case, the processing subsequent to image capturing is performed assuming that the enlargement rate exceeds 100% by a pinch-out operation.

In this case, the enlargement control unit 301 does not perform the processing in step S503 when the enlargement function is determined as valid in step S502 in FIG. 8. The enlargement control unit 301 determines whether the entire enlargement function or the magnifying glass function is valid, and performs the processing subsequent to step S503 when the magnifying glass function is valid. When the entire enlargement function is valid, the enlargement control unit 301 determines whether the enlargement rate exceeds 100% due to a pinch operation, and performs the processing subsequent to step S503 when the enlargement rate is determined as over 100%. The enlargement control unit 301 does not perform the processing in step S108 when the enlargement function is determined as valid in step S106 in FIG. 6. The enlargement control unit 301 determines whether the entire enlargement function or the magnifying glass function is valid, and performs the processing in step S108 when the magnifying glass function is valid. When the entire enlargement function is valid, the enlargement control unit 301 determines whether the enlargement rate exceeds 100% due to a pinch operation. The enlargement control unit 301 performs the processing in step S108 when it is determined that the enlargement rate exceeds 100%, and requests the screen control unit 201 to switch to the image in the expansion display area. The enlargement rate may employ a value calculated by the enlargement control unit 301 based on the event information notified from the input information notification unit 206 in the screen control unit 201 in step S403 in FIG. 7C. According to the present variant, the processing subsequent to image capturing is performed not when the entire enlargement function is valid but when a pinch-out operation is performed. Therefore, a processing load due to image capturing even when an operation for screen enlargement is not performed can be suppressed.

A second exemplary embodiment will be described below. The first exemplary embodiment describes the mechanisms of the entire enlargement display and the magnifying glass display for a screen generated by an application. However, the first exemplary embodiment does not consider a case in which while an image drawn in the expansion display area 603 is displayed on the display 119, the user may operate objects such as buttons or lists on the screen. Therefore, for example, even if the user performs a touch operation of selecting an enlarged button while the entire enlargement function is valid and the entire screen is being enlarged and displayed, an application does not react thereto. In the second exemplary embodiment, objects such as buttons or lists displayed on the enlarged image are operable as in a usual case.

As described in the first exemplary embodiment, when the magnifying glass function is valid, the magnifying glass frame can be moved by a drag operation, and when the entire enlargement function is valid, a display position of an enlarged image can be moved by a drag operation. Further, it is conceivable that a touch operation for selecting a button displayed within the magnifying glass frame and a drag operation for scrolling a list included in an image enlarged and displayed by the entire enlargement function may be performed. Thus, for example, when a drag operation is performed when the entire enlargement function is valid, it is necessary to appropriately determine whether the drag operation is performed to move a display position of the enlarged image or to scroll a list included in the enlarged image. The present exemplary embodiment describes an example in which an intention of the drag operation is determined depending on whether a long press operation of continuing to touch the same position on the touch panel 118 for a predetermined period of time is performed. The hardware configuration and the functional block of the information processing apparatus according to the second exemplary embodiment are the same as those of the information processing apparatus according to the first exemplary embodiment (see FIG. 1 and FIG. 2). Differences from the first exemplary embodiment will be described below.

Figure 10:
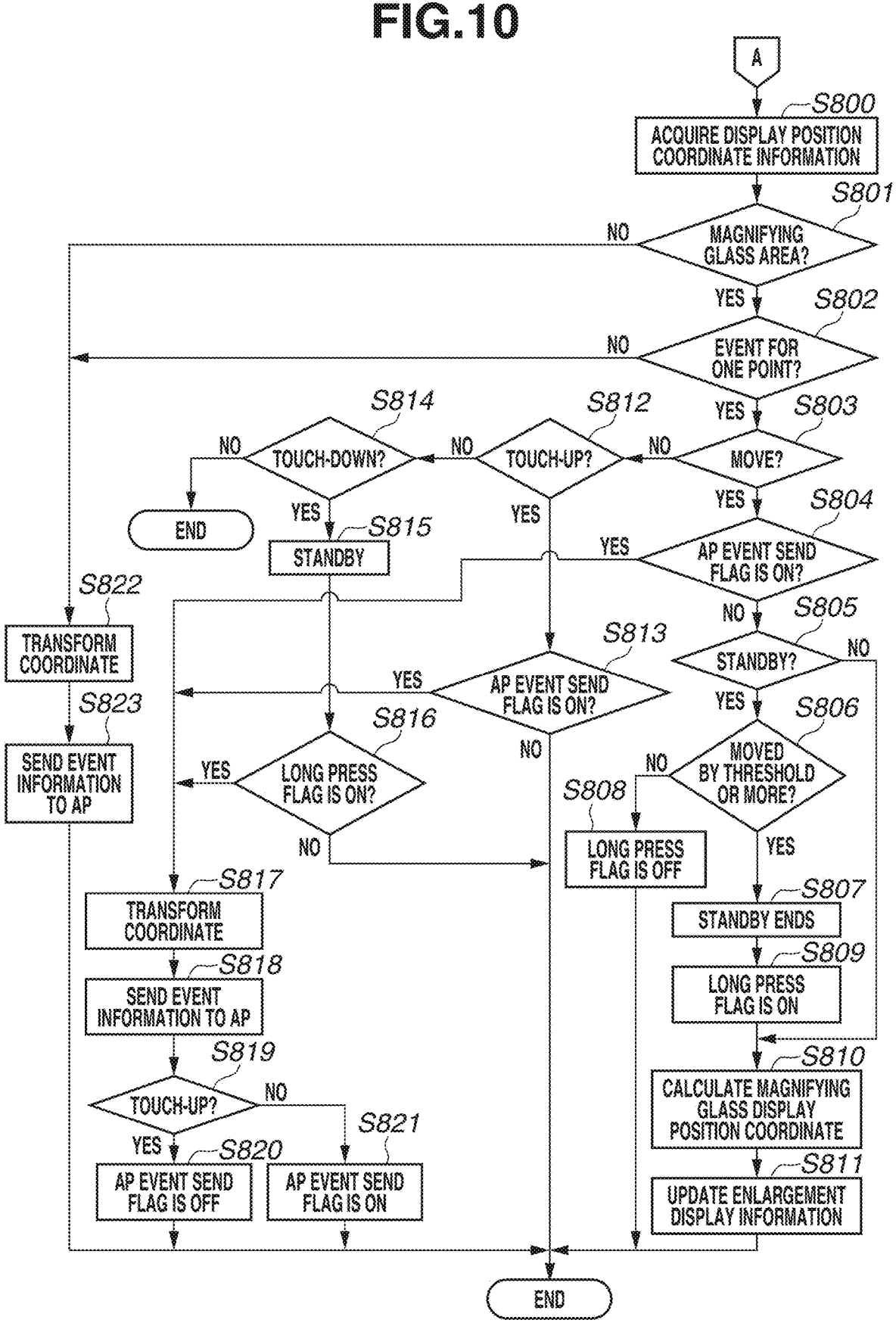
FIG. 10 is a flowchart of event processing for magnifying glass according to a second exemplary embodiment.

FIG. 10 is a flowchart illustrating event processing for magnifying glass. The processing in FIG. 10 is performed instead of the processing in FIG. 7B.

In step S800, the enlargement display control unit 307 acquires display position coordinate information about the magnifying glass from the enlargement display information storage unit 308. In step S801, the enlargement display control unit 307 determines whether the touch position acquired from the event information is within the display area of the magnifying glass frame acquired from the acquired display position coordinate information.

When the touch position is within the display area of the magnifying glass frame (YES in step S801), in step S802, the enlargement display control unit 307 determines whether the event information includes only coordinate information about one point. When the coordinate information is information about one point (YES in step S802), in step S803, the enlargement display control unit 307 determines whether the event information indicates Move. When the event information indicates Move (YES in step S803), in step S804, the enlargement display control unit 307 determines whether an AP event send flag is ON. The AP event send flag becomes ON when a touch event is being sent to the application unit 401. That is, when the AP event send flag is ON, all the events received by the enlargement display control unit 307 from the touch panel 118 are sent to AP in the normal display area, and thus the enlarged image is not moved. On the other hand, when the AP event send flag is OFF, no event is sent from the touch panel to AP in the normal display area, and processing of operating an enlarged image such as moving an enlarged image, is performed. The AP event send flag is set OFF in the initial state.

When the AP event send flag is ON (NO in step S804), in step S805, the enlargement display control unit 307 determines whether the processing is waiting for an event after Touch-down. As described below in steps S814 and S815, the processing waits for a certain period of time without immediately sending an event to AP or operating an enlarged image in order to determine whether a long press is done when first detecting Touch-down. In the processing in step S805, a determination is made as to whether a Move event is received during the standby time. When the processing is in the standby state (YES in step S805), in step S806, the enlargement display control unit 307 compares the coordinates received in the Move event with the coordinates received in the Touch-down event, and determines whether the touch position is moved by a threshold value or more.

When the touch position is moved by the threshold value or more (YES in step S806), the enlargement display control unit 307 determines that a long press is not done, and terminates the standby state in step S807, and similarly sets the long press flag OFF in step S809. When it is determined that the touch position is not moved by the threshold value or more (NO in step S806), in step S808, the enlargement display control unit 307 sets the long press flag ON, and terminates the processing. The long press flag is a flag for determining whether a user's touch operation is a long press operation of continuing to touch the same position for a predetermined period of time. When the touch position is hardly moved during the standby state after Touch-down is detected, the long press flag is ON. When the touch position is moved by a predetermined amount or more, the long press flag is OFF.

When the processing is not in the standby state (NO in step S805) or when the long press flag is set OFF in step S809, in step S810, the enlargement display control unit 307 calculates a display position coordinates of the magnifying glass frame. In step S811, the enlargement display control unit 307 updates the enlargement display information in the enlargement display information storage unit 308 according to a calculation result. The processing in steps S810 and S811 are the same as the processing in steps S305 and S306 in FIG. 7B.

When the event information does not indicate Move (NO in step S803), in step S812, the enlargement display control unit 307 determines whether the event information indicates Touch-up. When the event information indicates Touch-up (YES in step S812), in step S813, the enlargement display control unit 307 determines whether the AP event send flag is ON. When the AP event send flag is OFF (NO in step S813), the enlargement display control unit 307 terminates the processing. When the event information does not indicate Touch-up (NO in step S812), in step S814, the enlargement display control unit 307 determines whether the event information indicates Touch-down.

When the event information indicates Touch-down (YES in step S814), in step S815, the enlargement display control unit 307 waits for a predetermined period of time. When a predetermined period of time elapses, in step S816, the enlargement display control unit 307 determines whether the long press flag is ON. When the long press flag is OFF (NO in step S816), the enlargement display control unit 307 terminates the processing. When the event information does not indicate Touch-down (NO in step S814), the enlargement display control unit 307 terminates the processing.

When the long press flag is ON (YES in step S816) and when the AP event send flag is ON (YES in step S804 or YES in step S813), the enlargement display control unit 307 determines that sending the event to the AP is to be started. In step S817, the enlargement display control unit 307 transforms the coordinates indicating the touch position included in the event information into coordinates in the normal display area 602. That is, the enlargement display control unit 307 transforms coordinates in the expansion display area 603 into coordinates in the normal display area 602 in order to send all the touch events to the application unit 401. The coordinate transformation will be described with reference to FIG. 4.

The center coordinates 701 (x1, y1) in FIG. 4 indicates the center position of the magnifying glass frame 705 and the movement start point 703 (xx1, yy1) indicates the touch position included in the event information. The enlargement rate of the magnifying glass is R. Coordinates (x, y) in the normal display area 602 after coordinate transformation is carried out is expressed by the following equations by use of the upper left coordinates (1024, 0) in the expansion display area 603.

$$x=((xx1-1024)-x1)/R+x1$$

$$y=((yy1-y1)/R+y1$$

In step S818, the enlargement display control unit 307 updates the event information based on the coordinates calculated by coordinate transformation, and sends the event information to the application unit 401 via the screen control unit 201. In this way, the user touches the image enlarged and displayed within the magnifying glass frame, and thus the event information by the touch operation is transformed into the event information performed on the image in the normal display area 602. The transformed event information is notified to the AP which displays the image in the normal display area 602. The AP performs a predetermined operation based on the notified event information. Thus, the user can operate the AP while viewing the image enlarged and displayed within the magnifying glass frame.

After sending the event information, the enlargement display control unit 307 determines whether the event information indicates Touch-up. When the event information indicates Touch-up (YES in step S819), in step S820, the enlargement display control unit 307 sets the AP event send flag OFF. When the event information is other than Touch-up (NO in step S819), in step S821, the enlargement display control unit 307 sets the AP event send flag ON. The enlargement display control unit 307 sets the AP event send flag, and then terminates the event processing for magnifying glass.

When the touch position is outside the display area of the magnifying glass frame (NO in step S801), in step S822, the enlargement display control unit 307 transforms the coordinates indicating the touch position included in the event information into coordinates in the normal display area 602. Similarly, when the event information is not coordinate information about one point (NO in step S802), the enlargement display control unit 307 determines that a touch operation is performed on two or more points. In step S822, the enlargement display control unit 307 transforms the coordinates indicating the touch position included in the event information into coordinates in the normal display area 602. With reference to FIG. 4, coordinates (x, y) in the normal display area 602 after coordinate transformation is carried out is expressed by the following equations by use of the upper left coordinates (1024, 0) in the expansion display area 603.

$$x = xx1 - 1024$$

$$Y = yy1$$

In step S823, the enlargement display control unit 307 updates the event information by the coordinates calculated by coordinate transformation, and sends the updated event information to the application unit 401 via the screen control unit 201. In this way, when the user performs a touch operation on an image displayed outside the magnifying glass frame or performs a pinch operation on an image within the magnifying glass frame, the event information by the touch operation is transformed into the event information performed on the image in the normal display area 602. The transformed event information is notified to the AP displaying the image in the normal display area 602. The AP performs a predetermined operation based on the notified event information. The user can perform an AP operation precisely as displayed, regardless outside or inside the magnifying glass frame.

The flowchart of FIG. 10 will be described by way of specific examples. It is assumed that a send application for sending scanned data is activated in the information processing apparatus 101. Additionally, it is assumed that an address book screen is displayed to select a data send destination in the send application. It is assumed herein that the magnifying glass function is set as valid and the magnifying glass enlarges and displays part of the address book.

First, the user long presses a list in the address book within the magnifying glass frame and then performs a drag operation in order to scroll the list part in the address book displayed within the magnifying glass frame. In this case, Touch-down is first detected in step S814, and in step S815, the processing enters a standby state. Subsequently, in step S803, Move is detected during the standby state. However, at this time, the AP event send flag is OFF and a finger is not moved, and thus the processing proceeds from step S804, step S805, to step S806, and in step S808, the long press flag is ON. A Move event keeps being periodically detected until the standby time elapses, and thus the processing in steps S803 to S808 are repeatedly performed. When the standby time elapses, the processing proceeds to step S816. At this time, the long press flag is ON, and thus in steps S817 and S818, the coordinate transformation processing, and the processing of sending an event to the send application after coordinate transformation is carried out are performed. The event information does not indicate Touch-up (NO in step S819), and thus the processing proceeds to step S821, where the AP event send flag is ON.

When the user performs a drag operation after a long press, Move is detected again in step S803. At this time, the AP event send flag is ON (YES in step S804), and thus in steps S817 and S818, the coordinate transformation processing and the processing of sending the event to the send application after coordinate transformation is carried out are performed. In this way, the event information subjected to coordinate transformation based on the touch position is sent to the send application and the list in the address book is scrolled based on the event information in the send application while the user is performing a drag operation after a long press. The image being scrolled by the send application is captured by the enlargement control unit 301 in the processing in FIG. 8, and is displayed on the display 119 in the processing in FIG. 9B.

Subsequently, the user performs a drag operation on the magnifying glass frame in order to move the magnifying glass frame. In this case, Touch-down is detected in step S814 and the processing enters a standby state in step S815, and then in step S803, Move is detected. At this time, the AP event send flag is OFF (NO in step S804), and in step S805, the processing is in the standby state, and thus in step S806, the enlargement display control unit 307 determines whether the touch position is moved by a threshold value or more based on the coordinates received in the Touch-down event and the coordinates received in the Move event. Since the touch position is moved by the threshold value or more (YES in step S806) in the present case, in step S807, the standby state ends, and in step S809, the long press flag is OFF. In steps S810 and S811, the display position coordinates of the magnifying glass frame is calculated and the enlargement display information is updated.

As described above, when the user starts a drag operation immediately after performing Touch-down within the magnifying glass frame, the enlargement control unit processes the event to move the magnifying glass frame. On the other hand, when the user performs a drag operation outside the magnifying glass frame and when the user performs Touch-down within the magnifying glass frame, then waits for a predetermined period of time without moving the finger, and then performs a drag operation, the enlargement control unit 301 performs coordinate transformation in consideration of the enlargement rate and notifies the event to the AP. Therefore, the user can perform an AP operation by a drag operation such as scrolling a list displayed by AP, for example. During magnifying glass display such as pinch event, an event not processed by the enlargement control unit 301 is subjected to coordinate transformation in consideration of an enlargement rate, and is notified to AP. Thus, the user can perform an AP operation such as enlarging or downsizing an image displayed by AP, for example.

Figure 11:
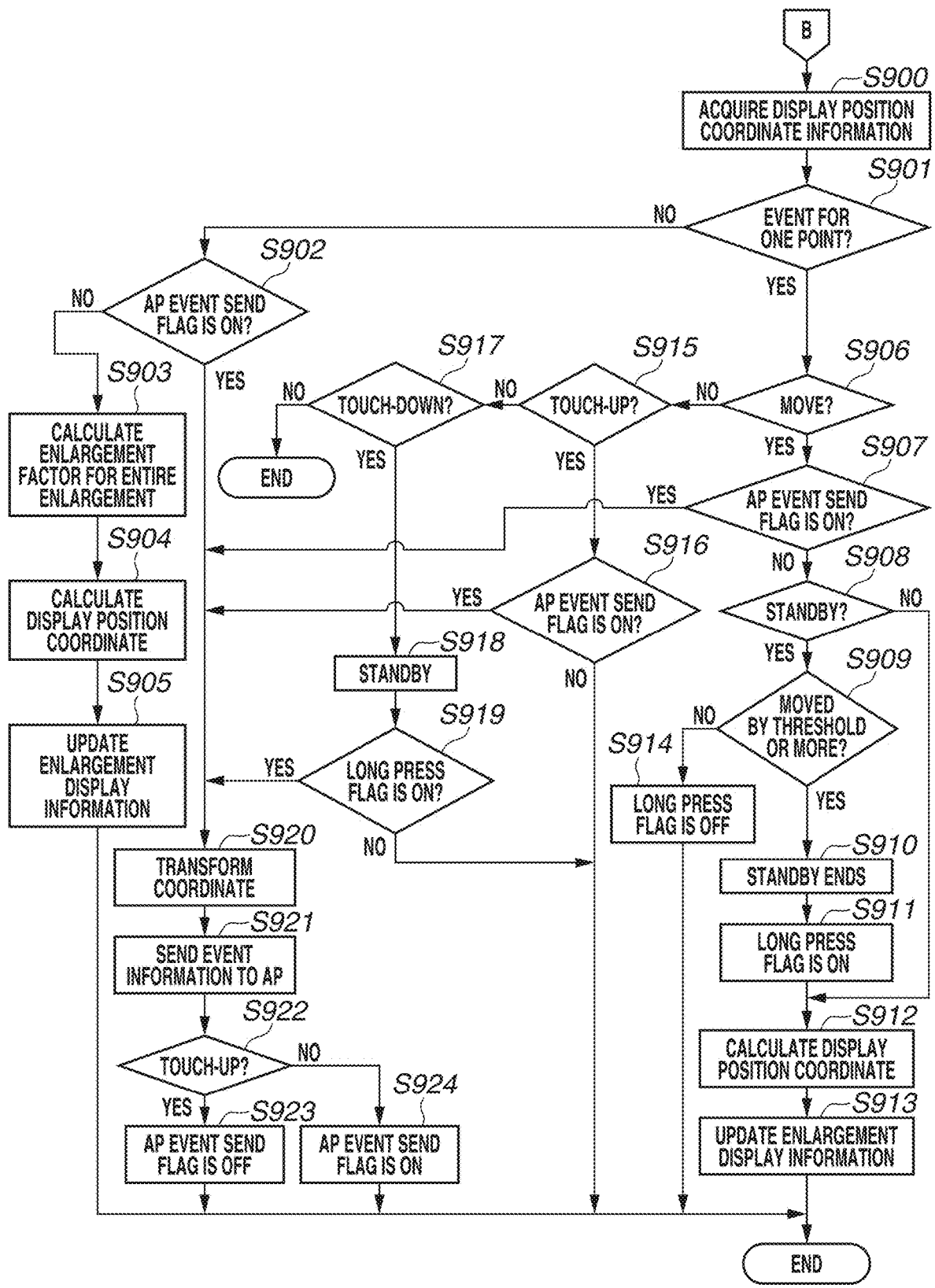
FIG. 11 is a flowchart of event processing for entire enlargement according to the second exemplary embodiment.

FIG. 11 is a flowchart illustrating the event processing for entire enlargement. The processing in FIG. 11 is performed instead of the processing in FIG. 7C.

In step S900, the enlargement display control unit 307 acquires display position coordinate information about the entire enlargement from the enlargement display information storage unit 308. In step S901, the enlargement display control unit 307 which has acquired the display position coordinate information determines whether the event information includes only coordinate information about one point.

When the coordinate information is not about one point (NO in step S901), the enlargement display control unit 307 determines that a touch operation is performed on two or more points, and in step S902, determines whether the AP event send flag is ON. As described above, the AP event send flag becomes ON while a touch event is being sent to the application unit 401. When the AP event send flag is OFF (NO in step S902), in step S903, the enlargement display control unit 307 calculates an entire enlargement rate by use of a plurality of pieces of coordinate information according to the event information. In step S904, the enlargement display control unit 307 calculates a display position coordinates by use of the pieces of coordinate information. In step S905, the enlargement display control unit 307 updates the enlargement display information in the enlargement display information storage unit 308 based on the calculated enlargement rate and display position coordinates. The processing in steps S903 to S905 are the same as the processing in steps S403 to S405 in FIG. 7C.

When the event information includes only coordinate information about one point (YES in step S901), in step S906, the enlargement display control unit 307 determines whether the event information indicates Move. When the event information indicates Move (YES in step S906), in step S907, the enlargement display control unit 307 determines whether the AP event send flag is ON. When the AP event send flag is OFF (NO in step S907), in step S908, the enlargement display control unit 307 determines whether the processing is waiting for an event after Touch-down. As described below in the processing in steps S917 and S918, sending an event to AP or operating an enlarged image is not immediately performed and the processing waits for a certain period of time in order to determine whether Touch-down is a long press when first detecting Touch-down. In step S908, the enlargement display control unit 307 determines whether a Move event is received during the standby time.

When the processing is in the standby state (YES in step S908), in step S909, the enlargement display control unit 307 compares the coordinates received in the Move event with the coordinates received in the Touch-down event, and determines whether the touch position is moved by a threshold value or more. When the touch position is moved by the threshold value or more (YES in step S909), in step S910, the enlargement display control unit 307 determines that Touch-down is not a long press, and terminates the standby state, and in step S911, sets the long press flag ON. After the processing in step S911 or when the processing is not in the standby state in step S908 (NO in step S908), in step S912, the enlargement display control unit 307 calculates a display position coordinates for entire enlargement. In step S913, the enlargement display control unit 307 updates enlargement display information in the enlargement display information storage unit 308 according to a calculation result. The processing in steps S912 and S913 are the same as the processing in steps S408 and S409 in FIG. 7C.

When it is determined that the touch position is not moved by the threshold value or more (NO in step S909), in step S914, the enlargement display control unit 307 sets the long press flag ON, and terminates the processing. As described above, the long press flag is a flag for determining whether a user's touch operation is a long press operation of keeping touching the same position for a predetermined period of time.

When the event information does not indicate Move in step S906 (NO in step S906), in step S915, the enlargement display control unit 307 determines whether the event information indicates Touch-up. When the event information indicates Touch-up (YES in step S915), in step S916, the enlargement display control unit 307 determines whether the AP event send flag is ON.

When the event information does not indicate Touch-up (NO in step S915), in step S917, the enlargement display control unit 307 determines whether the event information indicates Touch-down. When the event information indicates Touch-down (YES in step S917), in step S918, the enlargement display control unit 307 waits for a predetermined period of time. When a predetermined period of time elapses, in step S919, the enlargement display control unit 307 determines whether the long press flag is ON. When the long press flag is ON (YES in step S919), the enlargement display control unit 307 determines that sending the event to the AP is to be started, and performs the processing subsequent to step S920. When the long press flag is OFF (NO in step S919), the enlargement display control unit 307 terminates the processing. When the event information does not indicate Touch-down (NO in step S917), the enlargement display control unit 307 terminates the processing.

When the long press flag is ON (YES in step S919), in step S920, the enlargement display control unit 307 transforms the coordinates indicating the touch position included in the event information into coordinates in the normal display area 602. Also when the AP event send flag is ON (YES in step S902, YES in step S907, or YES in step S916), the enlargement display control unit 307 transforms the coordinates indicating the touch position included in the event information into coordinates in the normal display area 602. That is, the enlargement display control unit 307 transforms coordinates in the expansion display area 603 into coordinates in the normal display area 602 in order to send all the touch events to the application unit 401.

The coordinate transformation is performed as follows. For example, where an origin of an enlarged image is (x01, y01), an enlargement rate is R, and coordinates indicating a touch position included in event information is (xx1, yy1), coordinates (x, y) in the normal display area 602 after coordinate transformation are expressed by the following equations by use of the upper left coordinates (1024, 0) in the expansion display area 603.

$x=((xx1-1024)-x01)/R$ $y=(yy1-y01)/R$

In step S921, the enlargement display control unit 307 updates the event information by the coordinates calculated by coordinate transformation, and sends the event information to the application unit 401 via the screen control unit 201. In this way, when the user performs a touch operation on an enlarged image, the event information by the touch operation is transformed into the event information performed on the image in the normal display area 602. The transformed event information is notified to the AP displaying the image in the normal display area 602, and the AP performs a predetermined operation based on the notified event information. Therefore, the user can operate the AP while viewing the enlarged image.

After sending the event information, the enlargement display control unit 307 determines whether the event information indicates Touch-up. When the event information indicates Touch-up (YES in step S922), in step S923, the enlargement display control unit 307 sets the AP event send flag OFF. When the event information indicates other than Touch-up (NO in step S922), in step S924, the enlargement display control unit 307 sets the AP event send flag ON. The enlargement display control unit 307 sets the AP event send flag, and then terminates the event processing for entire enlargement.

The flowchart of FIG. 11 will be described by way of specific examples. It is assumed that the send application is activated and an address book screen for selecting a data send destination is displayed in the information processing apparatus 101. Here, the entire enlargement function is set valid and a list part in the address book is enlarged and displayed.

It is assumed that the user first does a long press of the list in the address book on the enlarged image and then performs a drag operation in order to scroll the enlarged list part in the address book. In this case, Touch-down is first detected in step S901, and then in step S918, the processing enters a standby state. Subsequently, in step S906, Move is detected during the standby state. Since the AP event send flag is OFF and the user does not move the finger at this time, the processing from step S907, step S908, to step S909 are performed, and in step S914, the long press flag is set ON. A Move event continues to be periodically detected until the standby time elapses, and thus the processing in steps S906 to S914 are repeatedly performed. When the standby time elapses, the processing in step S919 is performed. The long press flag is ON at this time, and thus in steps S920 and S921, the coordinate transformation processing and the processing of sending an event to the send application after coordinate transformation is carried out are performed. The event information does not indicate Touch-up (NO in step S922), and thus the processing in step S924 is performed and the AP event send flag is set ON.

When the user performs a drag operation after a long press, in step S906, Move is detected again. The AP event send flag is ON at this time (YES in step S907), and thus in steps S920 and S921, the coordinate transformation processing and the processing of sending an event to the send application after coordinate transformation are performed. In this way, while the user is performing a drag operation after a long press, the event information with transformed coordinates based on the touch position is sent to the send application, and the list part in the address book is scrolled based on the event information in the send application. The image being scrolled by the send application is captured in the processing in FIG. 8, and is displayed on the display 119 in the processing in FIG. 9B.

Subsequently, it is assumed that the user performs a drag operation on an enlarged image in order to move a display position of the entirely enlarged image. In this case, Touch-down is detected in step S917 and the processing enters a standby state in step S918, and then in step S906, Move is detected. The AP event send flag is OFF (NO in step S907) at this time, and in step S908, the processing is in the standby state. Thus in step S909, the enlargement display control unit 307 determines whether the touch position is moved by a threshold value or more based on the coordinates received in the Touch-down event and the coordinates received in the Move event. In the present case, the touch position is moved by the threshold value or more (YES in step S909), and thus in step S910, the standby state ends, and in step S911, the long press flag is set OFF. In steps S912 and S913, a display position coordinates for entire enlargement is calculated and the enlargement display information is updated.

As described above, when the user performs a drag operation immediately after Touch-down, the enlargement control unit 301 processes the event and moves the enlargement display position. On the other hand, if the user waits for a predetermined period of time without moving a finger and then performs a drag operation after Touch-down, the enlargement control unit 301 does not perform the processing of moving the enlargement display position, and performs coordinate transformation in consideration of the enlargement rate and notifies the event to the AP. Therefore, the user can perform an AP operation by a drag operation such as scrolling a list displayed by AP.

When the user performs a pinch operation immediately after Touch-down, the enlargement control unit 301 processes the event and changes the enlargement rate for entire enlargement. On the other hand, if the user waits for a predetermined period of time without moving a finger and then performs a pinch operation after Touch-down, the enlargement control unit 301 does not change the enlargement rate for entire enlargement, and performs coordinate transformation in consideration of the enlargement rate and notifies the coordinates to the AP. Therefore, the user can perform an AP operation by a drag operation such as enlarging or downsizing an image displayed by AP.

In the above example, whether an event is sent to AP or an operation is performed on an enlarged image is switched depending on whether a long press operation is first performed. However, the switching may be performed by other methods. For example, when the user performs Touch-down twice (double tap) at a predetermined short interval, the event may be sent to the AP. Alternatively, a dedicated button for instructing to send an event to AP may be displayed, and when the button is pressed, a touch event performed thereafter may be sent to the AP.

A third exemplary embodiment will be described below. The second exemplary embodiment has described the example in which when the user performs a touch operation such as Touch-down or Move while an enlarged screen is being displayed, coordinate transformation is performed in consideration of an enlargement rate or a display position and then event information is notified to a running AP. According to the present exemplary embodiment, whether to notify event information to AP is determined depending on whether coordinates of the event are included within a coordinate range in response to a notification of the coordinate range in which the event is processed in the AP, from the running AP. The hardware configuration of the information processing apparatus according to the third exemplary embodiment is similar to that of the information processing apparatus according to the first exemplary embodiment (see FIG. 1). Differences from the second exemplary embodiment will be mainly described.

Figure 12:
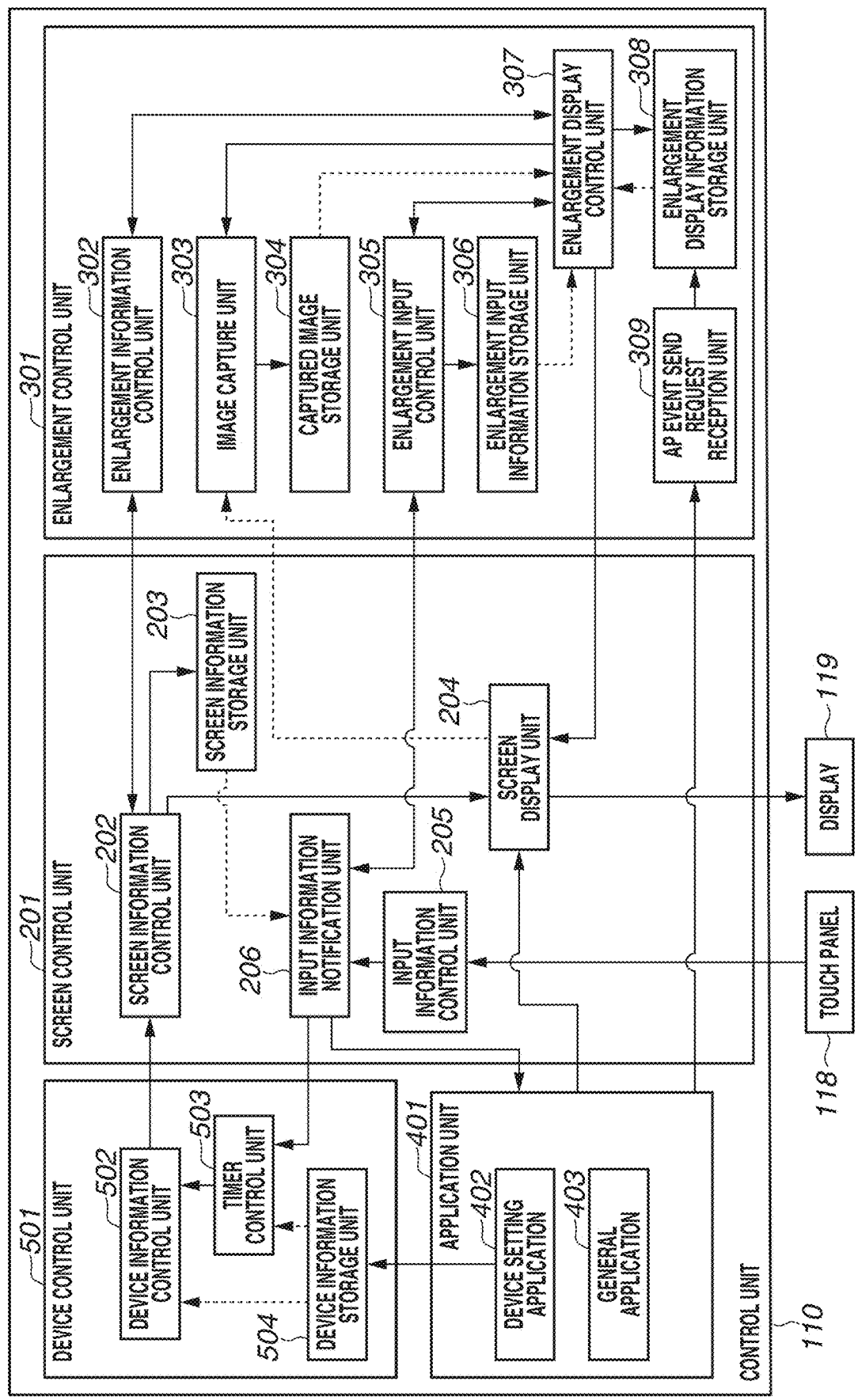
FIG. 12 is a functional block diagram of the control unit according to a third exemplary embodiment.

FIG. 12 is a functional block diagram of the information processing apparatus 101 according to the third exemplary embodiment. The information processing apparatus 101 includes an AP event send request reception unit 309 within the enlargement control unit 301 in addition to the components according to the first exemplary embodiment illustrated in FIG. 2. Other components are the same.

The AP event send request reception unit 309 receives an AP event send request from the application unit 401, and stores the AP event send request in the enlargement display information storage unit 308. The AP event send request includes information about an area range for requesting to send an event to AP. An application (the device setting application 402 or the general application 403) in the application unit 401 sends a drawing instruction to the screen display unit 204. Further, an application (the device setting application 402 or the general application 403) in the application unit 401 makes an AP event send request to the AP event send request reception unit 309 according to a display screen.

When event information is received, the enlargement display control unit 307 acquires the AP event send request information from the enlargement display information storage unit 308. Then, the enlargement display control unit 307 determines whether the touch position acquired from the event information is within the area range acquired from the AP event send request information. If the touch position is within the area range, the enlargement display control unit 307 performs coordinate transformation according to a determination result, and performs processing of sending the event to the application unit 401 via the screen control unit 201. The processing will be described below in detail.

Figure 13:
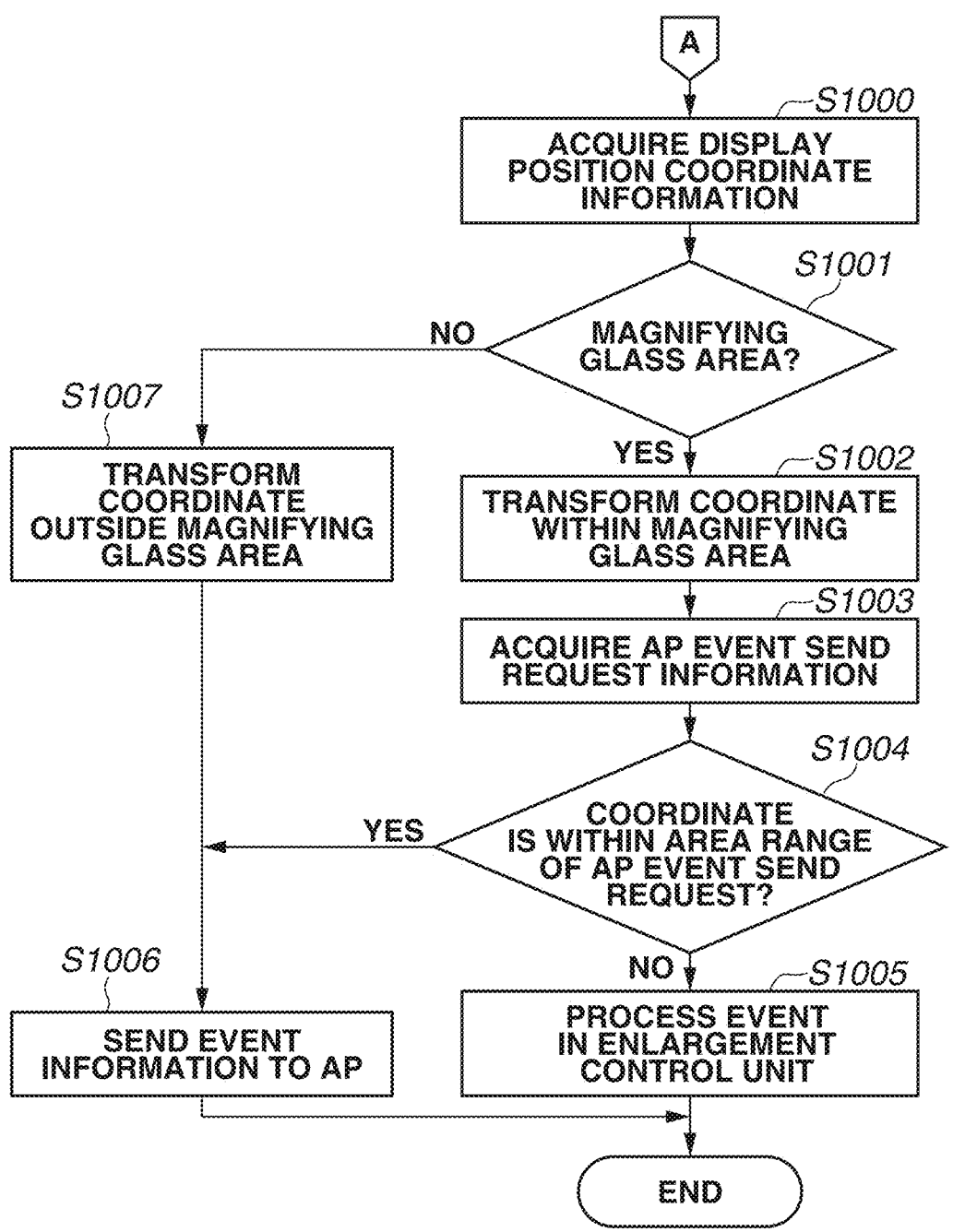
FIG. 13 is a flowchart of event processing for magnifying glass according to the third exemplary embodiment.
Figure 14:
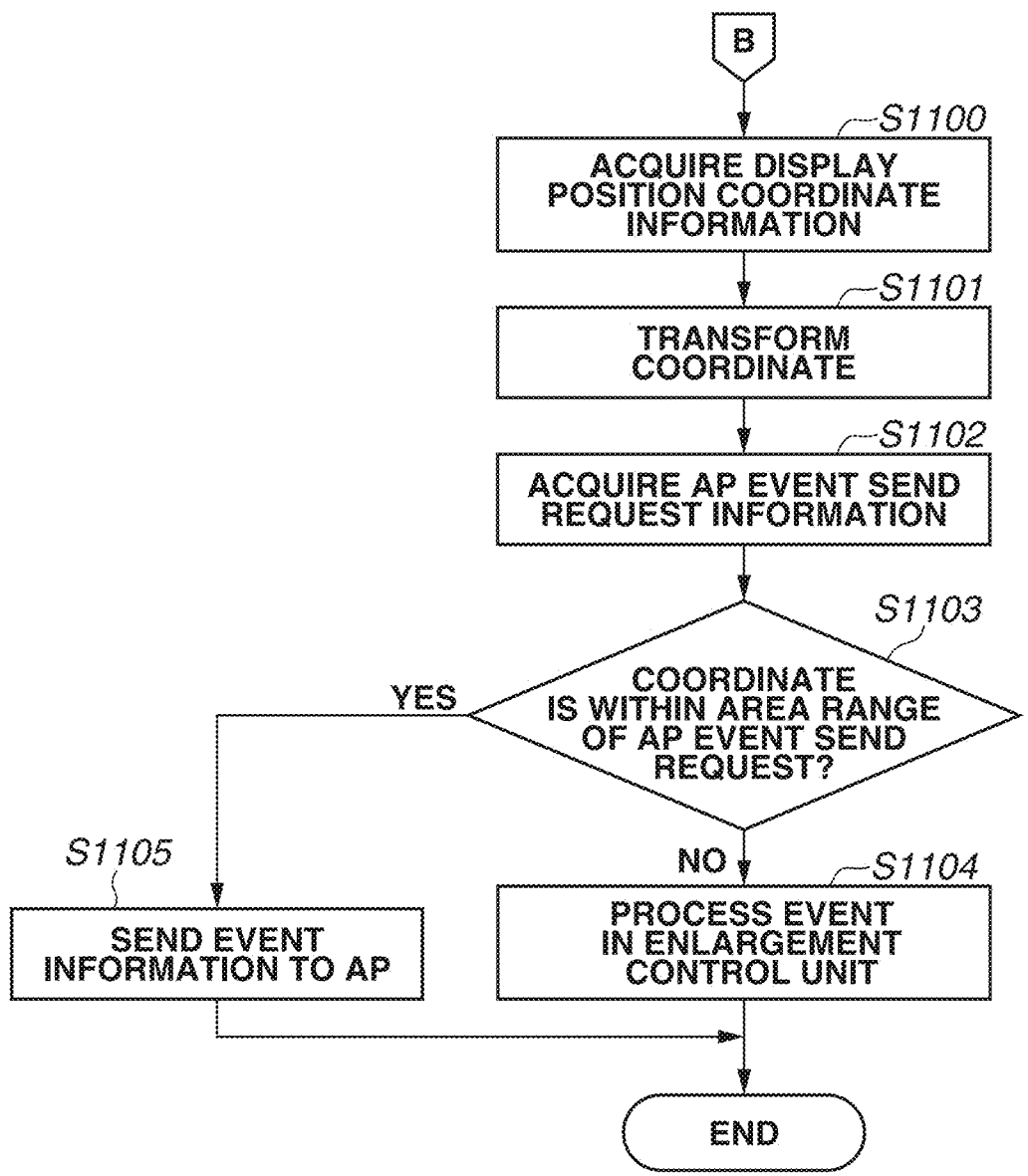
FIG. 14 is a flowchart of event processing for entire enlargement according to the third exemplary embodiment.

FIG. 13 and FIG. 14 are the flowcharts illustrating the event processing in response to input from the touch panel 118 by a user's operation. If there is an event corresponding to the input from the touch panel 118 by a user's operation, the processing in FIG. 7A is first performed. When the magnifying glass function is valid (magnifying glass in step S211) in the determination processing in step S211, the enlargement display control unit 307 performs the event processing for magnifying glass illustrated in FIG. 13. When the entire enlargement function is valid (entire enlargement in step S211), the enlargement display control unit 307 performs the event processing for entire enlargement illustrated in FIG. 14.

FIG. 13 is a flowchart illustrating the event processing for magnifying glass.

When performing the event processing for magnifying glass, in step S1000, the enlargement display control unit 307 acquires display position coordinate information about the magnifying glass from the enlargement display information storage unit 308. In step S1001, the enlargement display control unit 307 determines whether the touch position acquired from the event information is within the display area of the magnifying glass frame acquired from the acquired display position coordinate information.

When the touch position is within the display area of the magnifying glass frame (YES in step S1001), in step S1002, the enlargement display control unit 307 transforms the coordinates indicating the touch position included in the event information into coordinates in the normal display area 602. The coordinate transformation is the same as the processing in step S817 in FIG. 10. Subsequently, in step S1003, the enlargement display control unit 307 acquires the AP event send request information from the enlargement display information storage unit 308. Then in step S1004, the enlargement display control unit 307 determines whether the coordinates transformed in step S1002 is within the area range included in the AP event send request information. When the coordinates are within the area range included in the AP event send request information (YES in step S1004), in step S1006, the enlargement display control unit 307 updates the event information by the coordinates calculated by coordinate transformation, and sends the updated event information to the application unit 401 via the screen control unit 201.

When the coordinates are outside the area range included in the AP event send request information (NO in step S1004), in step S1005, the enlargement control unit 301 performs the event processing. That is, the processing of updating a magnifying glass display position is performed in the same way as described in steps S810 and S811 in FIG. 10. After the processing by the enlargement control unit 301, the enlargement display control unit 307 terminates the event processing for magnifying glass.

When the touch position is outside the display area of the magnifying glass frame (NO in step S1001), in step S1007, the enlargement control unit 301 transforms the coordinates indicating the touch position included in the event information into coordinates in the normal display area 602. The coordinate transformation is the same as the processing in step S822 in FIG. 10. In step S1006, the enlargement display control unit 307 updates the event information by the coordinates calculated by coordinate transformation, and sends the updated event information to the application unit 401 via the screen control unit 201. After sending the event information, the enlargement display control unit 307 terminates the event processing for magnifying glass.

FIG. 14 is a flowchart illustrating the event processing for entire enlargement. In step S1100, the enlargement display control unit 307 acquires display position coordinate information about the entire enlargement from the enlargement display information storage unit 308. In step S1101, the enlargement display control unit 307 which acquires the display position coordinate information transforms the coordinates indicating the touch position included in the event information into coordinates in the normal display area 602. The coordinate transformation is the same as the processing in step S920 in FIG. 11. Subsequently, in step S1102, the enlargement display control unit 307 acquires the AP event send request information from the enlargement display information storage unit 308. Then in step S1103, the enlargement display control unit 307 determines whether the coordinates transformed in step S1101 is within the area range included in the AP event send request information. When the coordinates are within the area range included in the AP event send request information (YES in step S1103), in step S1105, the enlargement display control unit 307 updates the event information by the coordinates calculated by coordinate transformation, and sends the updated event information to the application unit 401 via the screen control unit 201.

When the coordinates are outside the area range included in the AP event send request information (NO in step S1103), in step S1104, the enlargement control unit 301 performs the event processing. That is, the enlargement rate is changed, or the display position coordinate update processing or the drawing processing is performed as described in steps S903, S904, S905, S912, and S913 in FIG. 11. After the enlargement control unit performs the event processing, the enlargement display control unit 307 terminates the event processing for magnifying glass.

Figure 15:
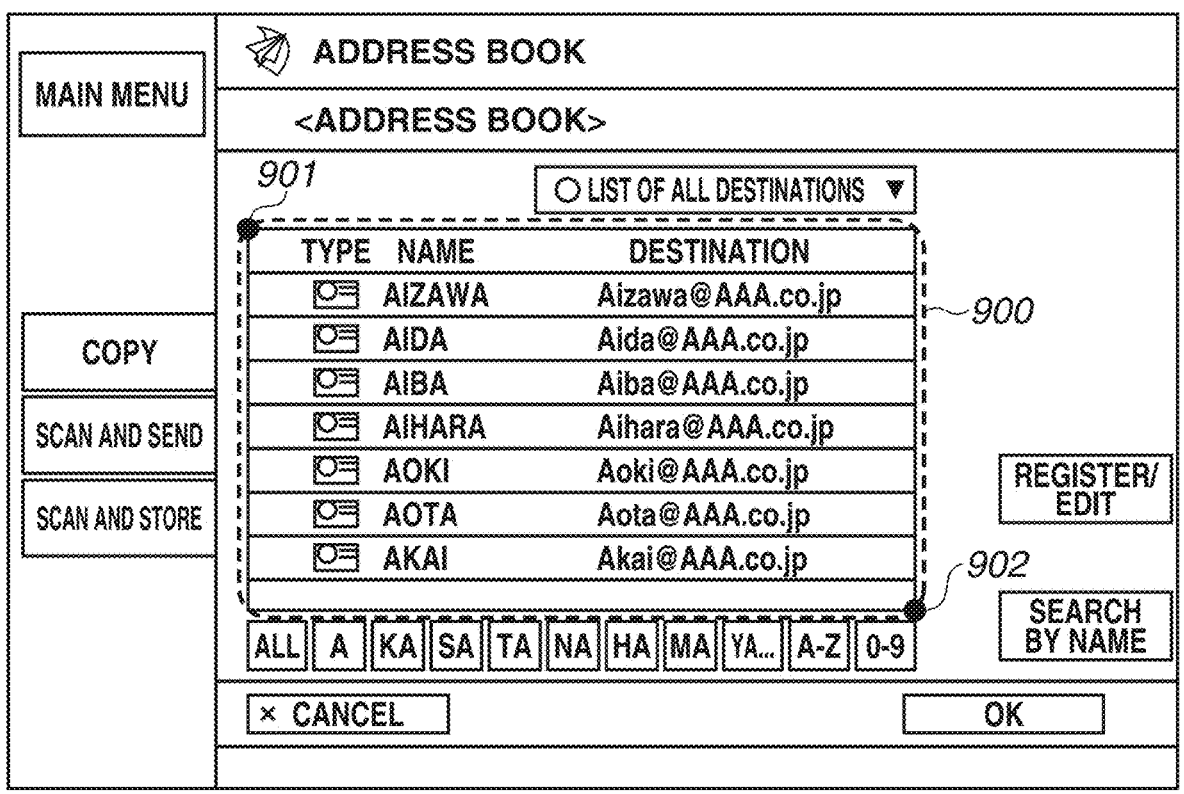
FIG. 15 is a diagram illustrating an exemplary screen displayed by a general application.

FIG. 15 is a diagram illustrating an exemplary screen displayed by the general application 403. An area 900 displays therein the list part in the address book stored in the information processing apparatus 101. When it is detected that a drag operation is performed within the area 900, the general application 403 performs scroll processing on the list. Even in a case of enlargement display by the magnifying glass function, when a drag operation is performed within the area 900, the general application 403 does not update the enlargement display position coordinates, but performs the list scroll which is the processing of the general application 403. In this case, the general application 403 may make an AP event send request including coordinate information about coordinates 901 and 902 for specifying the area 900 to the AP event send request reception unit 309 at the same time as sending an instruction to draw the screen information to the screen display unit 204. Thereby, even during the enlargement display, an operation performed within the area 900 is subjected to coordinate transformation and is notified to the general application 403. Therefore, when a drag operation is performed within the area 900, the list scroll processing is performed. On the other hand, when a drag operation is performed outside the area 900, an enlargement display position is changed. The area included in the AP event send request may be the entire normal display area. In this case, all the events are notified to the application unit 401.

As described above, the information processing apparatus 101 according to the present exemplary embodiment can provide the user with operations which the AP demands by instructing from the AP to send events within a predetermined area to the AP even during the enlargement display.

Figure 16:
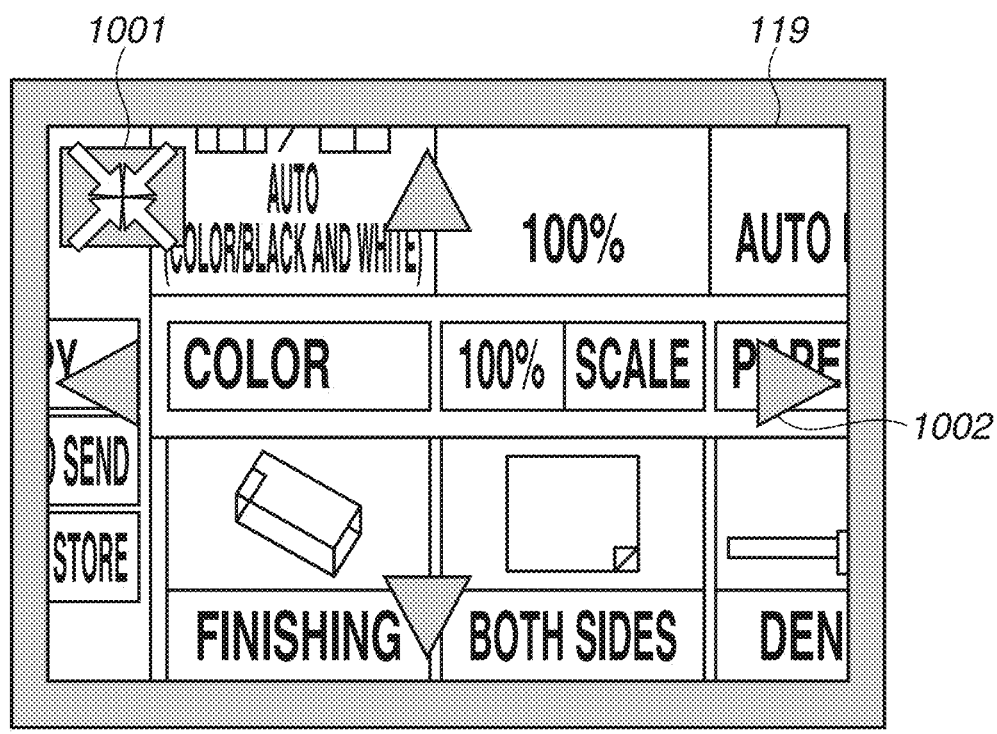
FIG. 16 is a diagram illustrating an exemplary image in which objects are displayed according to a fourth exemplary embodiment.

A fourth exemplary embodiment will be described below. In the fourth exemplary embodiment, an object configured to return an enlarged image to its original size and an object configured to display a hidden part of an enlarged image are displayed to be superimposed on the enlarged image. FIG. 16 is a diagram illustrating an exemplary image displaying the objects thereon. The hardware configuration and the functional block of the information processing apparatus according to the fourth exemplary embodiment are the same as those of the information processing apparatus according to the first exemplary embodiment (see FIG. 1 and FIG. 2).

In FIG. 16, an end button 1001 as an object for returning an image to its original size is provided. When the end button 1001 is touched, the control unit 110 terminates the enlargement function and displays the original-sized image on the display 119. Four arrow buttons 1002 as objects for displaying hidden parts of an enlarged image are provided. The arrow buttons 1002 are provided on the four sides of the display 119. When an arrow button 1002 is touched, the control unit 110 scrolls an image in the direction indicated by the touched arrow button 1002. A touch on the arrow buttons 1002 provides operability similar to Move. The screen display unit 204 superimposes the end button 1001 and the arrow buttons 1002 on an image drawn in the expansion display area 603 and displays the superimposed image on the display 119.

The arrow buttons 1002 are not displayed when a hidden image is not present in the scroll direction. The control unit 110 determines whether to display or hide the arrow buttons 1002 in response to an instruction from the enlargement display control unit 307. The enlargement display control unit 307 acquires display position coordinate information, and determines the presence of a hidden image in upward, downward, right, and left directions based on origin coordinates, a width, and a height of the enlarged image and a width and a height of the expansion display area 603, thereby determining whether to display or hide the arrow buttons 1002.

<Event Processing of End Button and Arrow Button>

Figure 17:
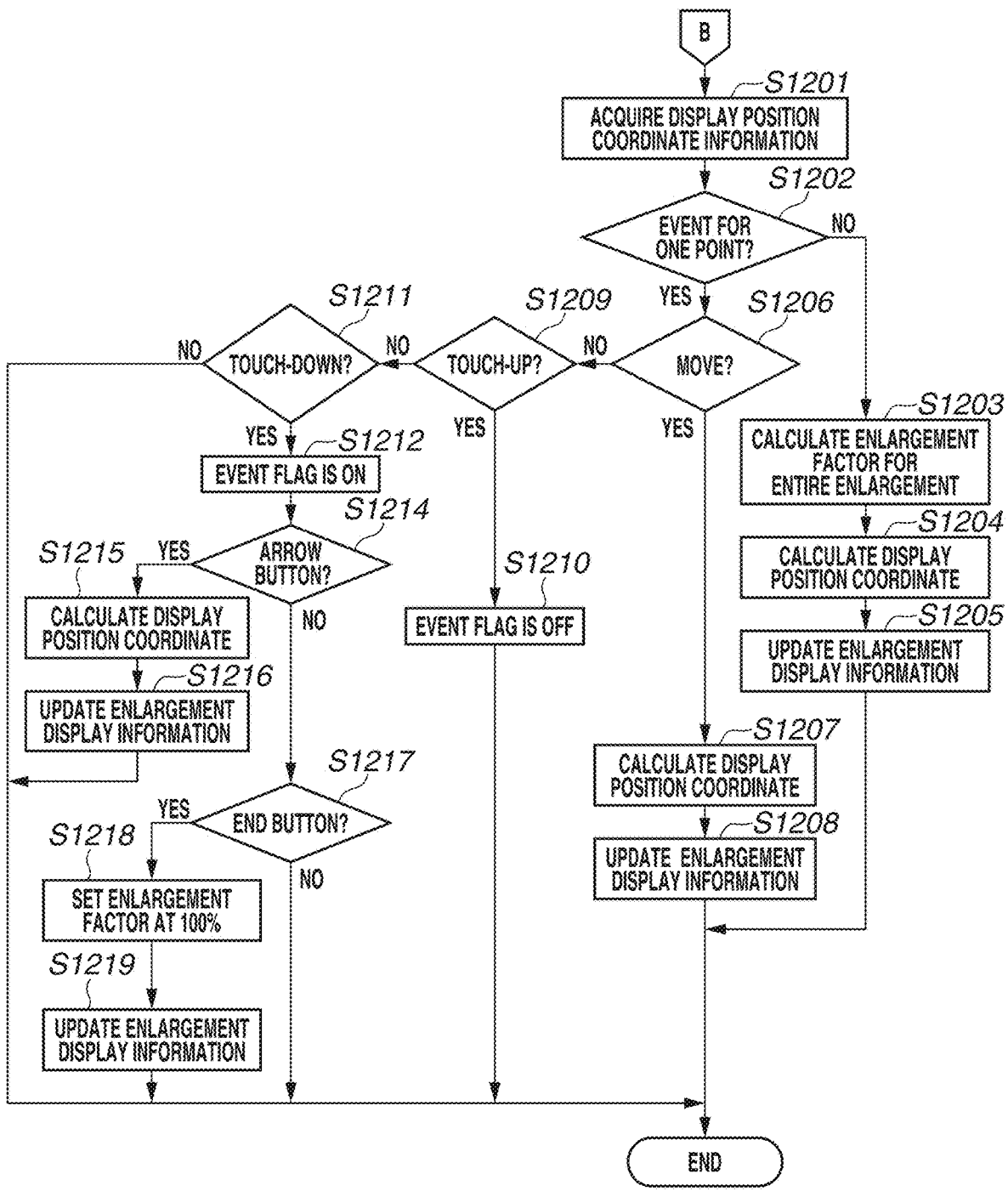
FIG. 17 is a flowchart of event processing according to the fourth exemplary embodiment.

FIG. 17 illustrates a variant of the flowchart of FIG. 7C, and is a flowchart illustrating the processing when the end button 1001 and the arrow buttons 1002 are touched. The processing in steps S1201 to S1212 in FIG. 17 are the same as the processing in steps S401 to S412 in FIG. 7C, and thus the description thereof will be omitted.

When the event information indicates Touch-down and the event flag is set ON, in step S1214, the enlargement display control unit 307 determines whether Touch-down is performed on an arrow button 1002 based on the event information. At this time, the enlargement display control unit 307 determines the arrow button 1002 which is touched. When Touch-down is performed on an arrow button 1002 (YES in step S1214), in step S1215, the enlargement display control unit 307 presumes that the image is moved in the direction indicated by the arrow button 1002 by certain coordinates, and calculates display position coordinate information. In step S1216, the enlargement display control unit 307 updates the enlargement display information in the enlargement display information storage unit 308 based on the calculated display position coordinates.

When Touch-down is not performed on an arrow button 1002 (NO in step S1214), in step S1217, the enlargement display control unit 307 determines whether Touch-down is performed on the end button 1001 based on the event information. When Touch-down is performed on the end button 1001 (YES in step S1217), the enlargement display control unit 307 returns the enlargement rate for entire enlargement to the original factor. Herein, in step S1218, the enlargement rate is returned to 100%. In step S1219, the enlargement display control unit 307 updates the enlargement display information in the enlargement display information storage unit 308 based on the enlargement rate. When Touch-down is not performed on the end button 1001 (NO in step S1217) or when the enlargement display control unit 307 finishes updating in the enlargement display information storage unit 308, the enlargement display control unit 307 terminates the processing.

Figure 18:
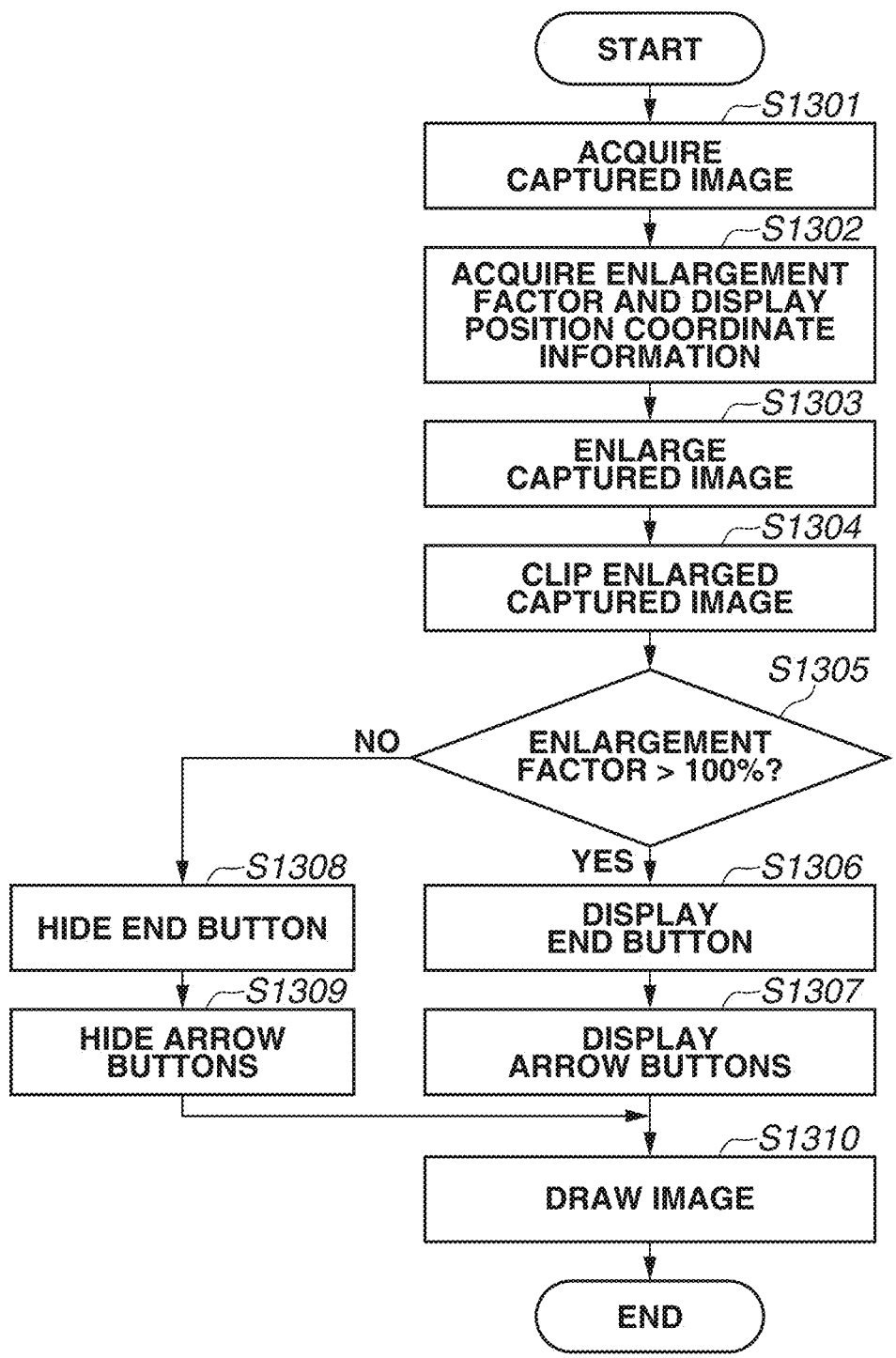
FIG. 18 is a flowchart of drawing processing for entire enlargement according to the fourth exemplary embodiment.

FIG. 18 is a flowchart illustrating drawing processing for entire enlargement. The processing in FIG. 18 is a variant of the processing in FIG. 9B, and the processing in steps S1301 to S1304 in FIG. 18 is the same as the processing in steps S701 to S704 in FIG. 9B, and thus the description thereof will be omitted.

In step S1305, the enlargement display control unit 307 clipping a captured image at the size of the display 119 determines whether the enlargement rate is higher than 100%. When the enlargement rate is higher than 100% (YES in step S1305), in step S1306, the enlargement display control unit 307 determines display of the end button 1001. Further, in step S1307, the enlargement display control unit 307 determines display of the upward, downward, right, and left buttons 1002 based on the display position coordinate information about the entirely-enlarged image. When the enlargement rate is 100% or less (NO in step S1305), in steps S1308 and S1309, the enlargement display control unit 307 determines that the end button 1001 and the arrow buttons 1002 are hidden. In this way, after determining that the end button 1001 and the arrow buttons 1002 are displayed or hidden, in step S1310, the enlargement display control unit 307 draws an image in the expansion display area 603. When displaying the end button 1001 and the arrow buttons 1002, the screen display unit 204 displays the image drawn in the expansion display area 603 on the display 119. When the end button 1001 and the arrow buttons 1002 are not displayed, the screen display unit 204 may display the image drawn in either the normal display area 602 or the expansion display area 603 on the display 119.

The end button 1001 and the arrow buttons 1002 described above are displayed, so that even the information processing apparatus 101 such as Smartphone, which takes practice, can be easily operated.

A fifth exemplary embodiment will be described below. The information processing apparatus 101 may perform the processing such as power saving mode or auto-clear for resetting the screen when the apparatus has not been operated for a predetermined period of time. The hardware configuration and the functional block of the information processing apparatus according to the fifth exemplary embodiment are the same as those of the information processing apparatus according to the first exemplary embodiment (see FIG. 1 and FIG. 2).

Figure 19:
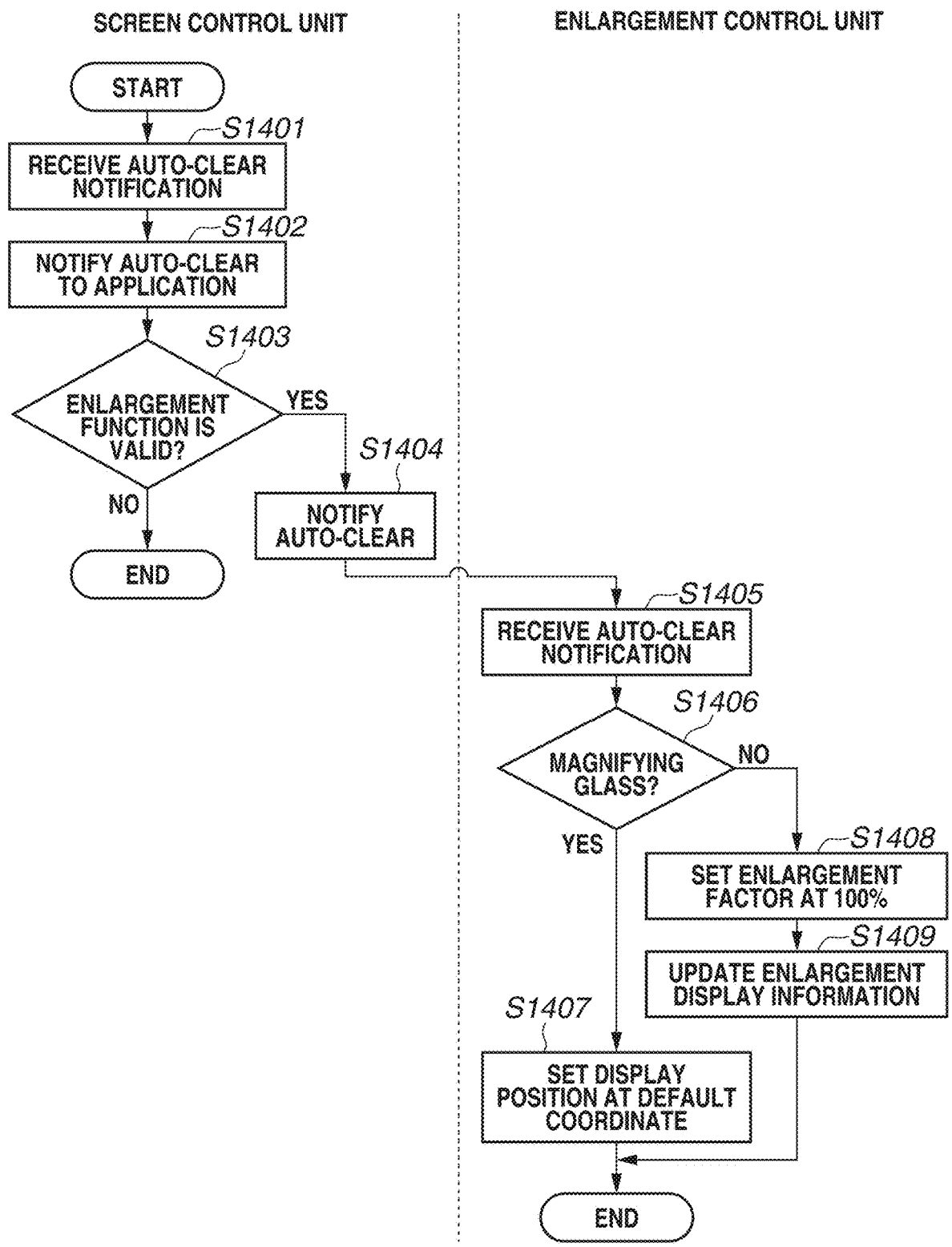
FIG. 19 is a flowchart of processing of returning an image to an original size by auto-clear according to a fifth exemplary embodiment.

The information processing apparatus 101 measures a user's operation interval by the timer control unit 503. When a predetermined period of time elapses from a previous operation, the timer control unit 503 sends a reset notification requesting the power saving mode or auto-clear to the device information control unit 502. The device information control unit 502 notifies the power saving mode or auto-clear to the screen control unit 201 in response to the reset notification from the timer control unit 503. The screen control unit 201 receives the power saving mode or auto-clear notification, and returns an image enlarged and displayed by the enlargement function to its original size, for example. FIG. 19 is a flowchart illustrating the processing of returning an image to its original size by the auto-clear processing. The processing in the flowchart is performed when the screen control unit 201 receives a power saving mode or auto-clear notification. The same processing is performed in other processing such as power saving mode.

When an auto-clear notification is received from the device information control unit 502 in step S1401, in step S1402, the screen information control unit 202 makes an auto-clear notification to the application unit 401. In step S1403, the screen information control unit 202 determines whether the enlargement function is valid based on the enlargement mode notification stored in the screen information storage unit 203. When the enlargement function is invalid (NO in step S1403), the screen information control unit 202 terminates the processing. When the enlargement function is valid (YES in step S1403), in step S1404, the screen information control unit 202 makes an auto-clear notification to the enlargement information control unit 302.

When the auto-clear notification is received from the screen information control unit 202, in step S1405, the enlargement information control unit 302 sends an enlargement mode notification to the enlargement display control unit 307. In step S1406, the enlargement display control unit 307 receives the enlargement mode notification, and determines whether the enlargement function is magnifying glass. When the enlargement function is magnifying glass (YES in step S1406), in step S1407, the enlargement display control unit 307 sets the magnifying glass at default coordinates. When the enlargement function is entire enlargement (NO in step S1406), in steps S1408 and S1409, the enlargement display control unit 307 sets the enlargement rate for entire enlargement at 100% and updates the enlargement display information in the enlargement display information storage unit 308.

As described above, when the information processing apparatus 101 is not operated for a predetermined period of time and an event such as power saving mode or auto-clear occurs, an entirely-enlarged image is returned to its original size. Therefore, an enlarged image is not displayed at the start of operation performed by a next user.

A sixth exemplary embodiment will be described below. According to the first exemplary embodiment, the virtual display area 601 is provided with the normal display area 602 and the expansion display area 603 in FIG. 3 and an image in one of the display areas is presented on the display 119. To the contrary, an enlarged image may be displayed without the expansion display area 603. FIG. 20 is an explanatory diagram of a method for displaying an enlarged image. The hardware configuration and the functional block of the information processing apparatus according to the sixth exemplary embodiment are the same as those of the information processing apparatus according to the first exemplary embodiment (see FIG. 1 and FIG. 2).

In a typical window system, RootWindow at the highest order is in a state to be immediately output to the display, and is configured of a plurality of combined Windows with the same size. For example, in FIG. 20, RootWindow 1101 is configured of an enlargement function Window 1102 for displaying an enlarged image, a base Window 1103, and an application Window 1104. The base Window 1103 and the application Window 1104 are combined with each other thereby to form an image similar to that in the normal display area 602 in FIG. 3.

When an enlarged image is displayed only in the normal display area 602, if an image in the RootWindow 1101 is acquired to obtain a captured image, the enlarged image itself is captured. When the expansion display area 603 is present, when RootWindow is acquired, only an enlarged image is not captured and an image in the normal display area 602 can be handled as it is. An image in the base Window 1103 and an image in the application Window 1104 are captured to be combined with each other in order to obtain an original image only in the normal display area 602. In FIG. 20, an upper left origin 1105 of a captured image in the application Window 1104 and coordinates 1106 of a captured image in the base Window 1103 are combined with each other thereby to finally generate a captured image of the original image. The captured image acquired by the combination is enlarged and displayed in the enlargement function Window 1102, and thus the operations equivalent to those in the first exemplary embodiment become possible.

As described above, even in a system which cannot provide the expansion display area in addition to the normal display area, individual Windows are acquired to generate a captured image, thereby obtaining similar effects.

The information processing apparatus 101 includes various apparatuses. For example, the information processing apparatus 101 is not limited to a personal computer, PDA, and cell phone, but includes a printer, scanner, facsimile (FAX), copying machine, multifunction peripheral, camera, video camera, and other image viewer.

As described above, according to each of the exemplary embodiments, either of a not-enlarged first image and a second image as the enlarged first image is displayed on a display apparatus thereby to realize an enlargement function without system-level customization.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus, the image processing apparatus comprising:
   a display that displays an image;
   a display memory that has a first memory area and a second memory area configured to be used for displaying the image on the display; and at least one processor that causes the image processing apparatus to act as:
- a display control unit configured to display an image on the display; and
- a drawing control unit configured to, based on a first image drawn in the first memory area, generate a second image that is an enlarged image of the first image and draw the second image in the second memory area;
- wherein, when an operation for image enlargement is received from a user with the first image displayed on the display, the display control unit changes a memory area to be read from the first memory area to the second memory area so as to switch the image displayed on the display from the first image to the second image, with the first image drawn in the first memory area and with the second image drawn in the second memory area, and
- wherein, when an operation for aborting the image enlargement is further received from the user, the display control unit switches the image displayed on the display from the second image to the first image by returning the memory, and
- wherein an operating system (OS) of the image processing apparatus does not have a display image enlargement function.

2. The image processing apparatus according to claim 1, wherein the at least one processor of the image processing apparatus further comprises
- a storage unit configured to store information about an image enlargement rate and an image display position instructed by the user's operation for the image enlargement;
- wherein, based on the information stored in the storage unit, the drawing control unit generates the second image that is the enlarged image of the first image and draws the second image.

3. The image processing apparatus according to claim 1, wherein processing corresponding to an operation position of a user operation performed on the second image obtained by enlarging the first image is to be performed in a case where the user operation performed on the second image is a long press operation, and
wherein an enlarged display area displayed in the second display image is changed in a case where the user operation performed on the second image obtained by enlarging the first image is not a long press operation.

4. The image processing apparatus according to claim 1, wherein, in a case where the operation for the image enlargement is received from the user with the first image displayed on the display to switch the image displayed on the display from the first image to the second image, the first image remains drawn in the first memory area.

5. The image processing apparatus according to claim 1, wherein the operation for the image enlargement is a pinch operation.

6. The image processing apparatus according to claim 1, wherein, when an image enlargement function is enabled, based on the first image drawn in the first memory area, the drawing control unit generates the second image that is the enlarged image of the first image and draws the second image in the second memory area.

7. The image processing apparatus according to claim 1, wherein, when an image enlargement function is disabled, the drawing control unit does not draw the second image in the second memory area.

8. The image processing apparatus according to claim 1, wherein the at least one processor of the image processing apparatus further comprises a conversion unit configured to, when a touch operation on the second image is received from the user with the second image displayed on the display, convert the touch operation into touch operation information for the first image.

9. The image processing apparatus according to claim 8, wherein, when the touch operation on the second image is received, the conversion unit converts a touch position of the touch operation into a touch position for the first image.

10. A non-transitory computer readable storage medium storing a computer program causing a computer of an image processing apparatus to execute a control method, the control method comprising:
- displaying an image on a display using a display memory that has a first memory area and a second memory area configured to be used for displaying the image on the display; and processing the image using at least one processor that causes the at least one processor to act as:
- a display control unit configured to display an image on the display; and
- a drawing control unit configured to, based on a first image drawn in the first memory area, generate a second image that is an enlarged image of the first image and draw the second image in the second memory area; wherein, when an operation for image enlargement is received from a user with the first image displayed on the display, the display control unit changes a memory area to be read so as to switch the image displayed on the display from the first image to the second image, with the first image drawn in the first memory area and with the second image drawn in the second memory area, and wherein, when an operation for aborting the image enlargement is further received from the user, the display control unit switches the image displayed on the display from the second image to the first image by returning the memory area to be read to the first memory area,
- wherein an operating system (OS) of the image processing apparatus does not have a display image enlargement function.

11. A control method for an image processing apparatus, the control method comprising:
- displaying an image on a display using a display memory that has a first memory area and a second memory area configured to be used for displaying the image on the display;
- receiving a user operation on the displayed image;

processing the image using at least one processor that causes the at least one processor to act as:
- a display control unit configured to display an image on the display; and
- a drawing control unit configured to, based on a first image drawn in the first memory area, generate a second image that is an enlarged image of the first image and draw the second image in the second memory area; wherein, when an operation for image enlargement is received from a user with the first image displayed on the display, the display control unit changes a memory area to be read so as to switch the image displayed on the display from the first image to the second image, with the first image drawn in the first memory area and with the second image drawn in the second memory area, and wherein, when an operation for aborting the image enlargement is further received from the user, the display control unit switches the image displayed on the display from the second image to the first image by returning the memory area to be read to the first memory area,
wherein an operating system (OS) of the image processing apparatus does not have a display image enlargement function.

* * * * *